(12) United States Patent
Joten

(10) Patent No.: US 7,256,844 B2
(45) Date of Patent: Aug. 14, 2007

(54) LIQUID CRYSTAL DISPLAY DEVICE

(75) Inventor: Kazuhiro Joten, Kanazawa (JP)

(73) Assignee: Toshiba Matsushita Display Technology Co., Ltd., Tokyo (JP)

(*) Notice: Subject to any disclaimer, the term of this patent is extended or adjusted under 35 U.S.C. 154(b) by 119 days.

(21) Appl. No.: 10/986,382

(22) Filed: Nov. 12, 2004

(65) Prior Publication Data

US 2005/0128388 A1 Jun. 16, 2005

Related U.S. Application Data

(63) Continuation of application No. PCT/JP04/00521, filed on Apr. 12, 2004.

(30) Foreign Application Priority Data

Apr. 15, 2003 (JP) ............................. 2003-110516

(51) Int. Cl.
G02F 1/1335 (2006.01)
(52) U.S. Cl. ........................................ 349/96; 349/102
(58) Field of Classification Search ................. 349/96, 349/102
See application file for complete search history.

(56) References Cited

U.S. PATENT DOCUMENTS

| | | | |
|---|---|---|---|
| 4,844,569 A * | 7/1989 | Wada et al. ................. 349/117 |
| 4,909,606 A * | 3/1990 | Wada et al. ................. 349/117 |
| 5,061,042 A * | 10/1991 | Nakamura et al. .......... 349/102 |
| 5,285,303 A * | 2/1994 | Okada et al. ............... 349/117 |
| 5,410,422 A * | 4/1995 | Bos ........................... 349/117 |
| 5,570,214 A * | 10/1996 | Abileah et al. ............. 349/117 |
| 5,579,139 A * | 11/1996 | Abileah et al. ............. 349/117 |
| 5,619,352 A * | 4/1997 | Koch et al. .................. 349/89 |
| 5,715,028 A * | 2/1998 | Abileah et al. ............. 349/117 |
| 6,628,369 B2 * | 9/2003 | Kumagai et al. ........... 349/194 |

(Continued)

FOREIGN PATENT DOCUMENTS

JP          1-270024         10/1989

(Continued)

OTHER PUBLICATIONS

U.S. Appl. No. 11/219,761, filed Sep. 7, 2005, Joten.

(Continued)

*Primary Examiner*—James A. Dudek
(74) *Attorney, Agent, or Firm*—Oblon, Spivak, McClelland, Maier & Neustadt, P.C.

(57) ABSTRACT

A semi-transmission type liquid crystal display device includes a liquid crystal display panel LPN in which a liquid crystal layer LQ is held between an array substrate AR and a counter-substrate CT that are disposed to face each other, a first polarization control element POL1 provided on an outer surface of the array substrate AR, which is opposed to a surface of the array substrate AR that holds the liquid crystal layer LQ, and a second polarization control element POL2 provided on an outer surface of the counter-substrate CT, which is opposed to a surface of the counter-substrate CT that holds the liquid crystal layer LQ. The first polarization control element POL1 and second polarization control element POL2 control a polarization state of light that passes therethrough, such that light in a polarization state of elliptically polarized light is to be incident on the liquid crystal layer LQ.

6 Claims, 15 Drawing Sheets

U.S. PATENT DOCUMENTS

2005/0128388 A1    6/2005    Joten

FOREIGN PATENT DOCUMENTS

| JP | 2001-42317 | 2/2001 |
| JP | 2001-93494 | 4/2001 |
| JP | 2001-356344 | 12/2001 |
| JP | 2002-82331 | 3/2002 |
| JP | 2002-258268 | 9/2002 |
| TW | 489241 | 6/2002 |
| TW | 00565722 | 12/2003 |

OTHER PUBLICATIONS

U.S. Appl. No. 10/934,433, filed Sep. 7, 2004, Joten.
U.S. Appl. No. 10/986,382, filed Nov. 12, 2004, Joten.
U.S. Appl. No. 10/995,323, filed Nov. 24, 2004, Joten.
U.S. Appl. No. 10/995,495, filed Nov. 24, 2004, Joten.

* cited by examiner

| A | 1° |
|---|---|
| B | 38° |
| C | 100° |
| D | 155° |
| R VALUE OF FIRST PHASE PLATE | 160nm |
| R VALUE OF SECOND PHASE PLATE | 140nm |

$\theta 2 = 37°$
$\theta 1 = 55°$

| | COMPARATIVE EXAMPLE 1 (TWO PHASE PLATES) | COMPARATIVE EXAMPLE 2 (SINGLE PHASE PLATE) |
|---|---|---|
| ELLIPTICITY | 0.88 | 0.88 |
| REFLECTANCE | 7.00% | 6.30% |
| CONTRAST | 25 | 8 |
| HUE OF WHITE | (0.319, 0.339) | (0.333, 0.358) |

| | COMPARATIVE EXAMPLE 1 (TWO PHASE PLATES) | EMBODIMENT 1 (SINGLE PHASE PLATES) |
|---|---|---|
| ELLIPTICITY | 0.88 | 0.75 |
| RE-FLECTION REFLECTANCE | 7.00% | 6.98% |
| RE-FLECTION CONTRAST | 25 | 15 |
| RE-FLECTION HUE OF WHITE | (0.319, 0.339) | (0.321, 0.341) |
| TRANS-MISSION TRANSMITTANCE | 4.4% | 4.4% |
| TRANS-MISSION CONTRAST | 136 | 113 |
| TRANS-MISSION HUE OF WHITE | (0.303, 0.327) | (0.310, 0.330) |

| | | |
|---|---|---|
| A | 10° | θ2=40° |
| B | 50° | |
| C | 100° | θ1=54° |
| D | 154° | |
| R VALUE OF FIRST PHASE PLATE | 140nm | |
| R VALUE OF SECOND PHASE PLATE | 120nm | |

|  |  | COMPARATIVE EXAMPLE 3 (TWO PHASE PLATES) | EMBODIMENT 2 (SINGLE PHASE PLATE) |
|---|---|---|---|
|  | ELLIPTICITY | 0.88 | 0.73 |
| RE-FLECTION | REFLECTANCE | 7.20% | 7.21% |
|  | CONTRAST | 15 | 10 |
|  | HUE OF WHITE | (0.315, 0.348) | (0.317, 0.344) |
| TRANS-MISSION | TRANSMITTANCE | 4.40% | 4.40% |
|  | CONTRAST | 70 | 80 |
|  | HUE OF WHITE | (0.317, 0.337) | (0.321, 0.345) |

FIG. 13

| A | 1° | } θ2=35° |
|---|---|---|
| B | 36° | |
| C | 93.5° | } θ1=53° |
| D | 146.5° | |
| R VALUE OF FIRST PHASE PLATE | 145nm | |
| R VALUE OF SECOND PHASE PLATE | 145nm | |

FIG. 14

| | | COMPARATIVE EXAMPLE 4 (TWO PHASE PLATES) | EMBODIMENT 3 (SINGLE PHASE PLATE) |
|---|---|---|---|
| | ELLIPTICITY | 0.67 | 0.67 |
| RE-FLECTION | REFLECTANCE | 8.30% | 8.30% |
| | CONTRAST | 13 | 12 |
| | HUE OF WHITE | (0.317, 0.343) | (0.321, 0.344) |
| TRANS-MISSION | TRANSMITTANCE | 4.20% | 4.20% |
| | CONTRAST | 60 | 70 |
| | HUE OF WHITE | (0.289, 0.327) | (0.295, 0.330) |

FIG. 15

| | | |
|---|---|---|
| A | 1° | } θ2=35° |
| B | 36° | |
| C | 91.5° | } θ1=53.5° |
| D | 145° | |
| R VALUE OF FIRST PHASE PLATE | 145nm | |
| R VALUE OF SECOND PHASE PLATE | 145nm | |

FIG. 18

| | | COMPARATIVE EXAMPLE 5 (TWO PHASE PLATES) | EMBODIMENT 4 (SINGLE PHASE PLATE) |
|---|---|---|---|
| | ELLIPTICITY | 0.67 | 0.67 |
| RE-FLECTION | REFLECTANCE | 7.50% | 7.60% |
| | CONTRAST | 23 | 23 |
| | HUE OF WHITE | (0.327, 0.361) | (0.322, 0.355) |
| TRANS-MISSION | TRANSMITTANCE | 4.20% | 4.20% |
| | CONTRAST | 125 | 188 |
| | HUE OF WHITE | (0.303, 0.328) | (0.304, 0.327) |

FIG. 19

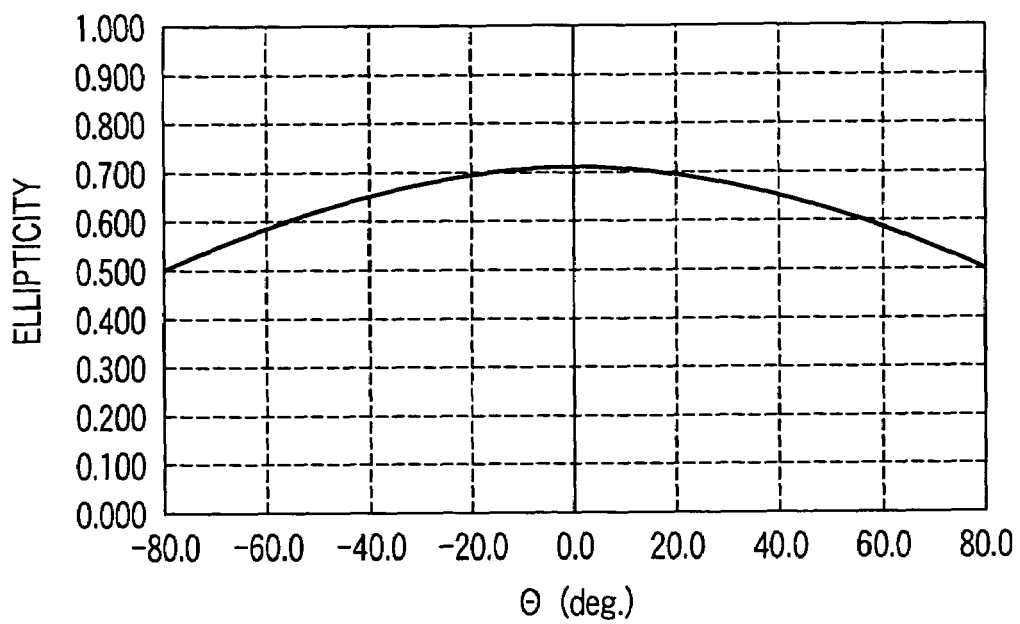
F I G. 20
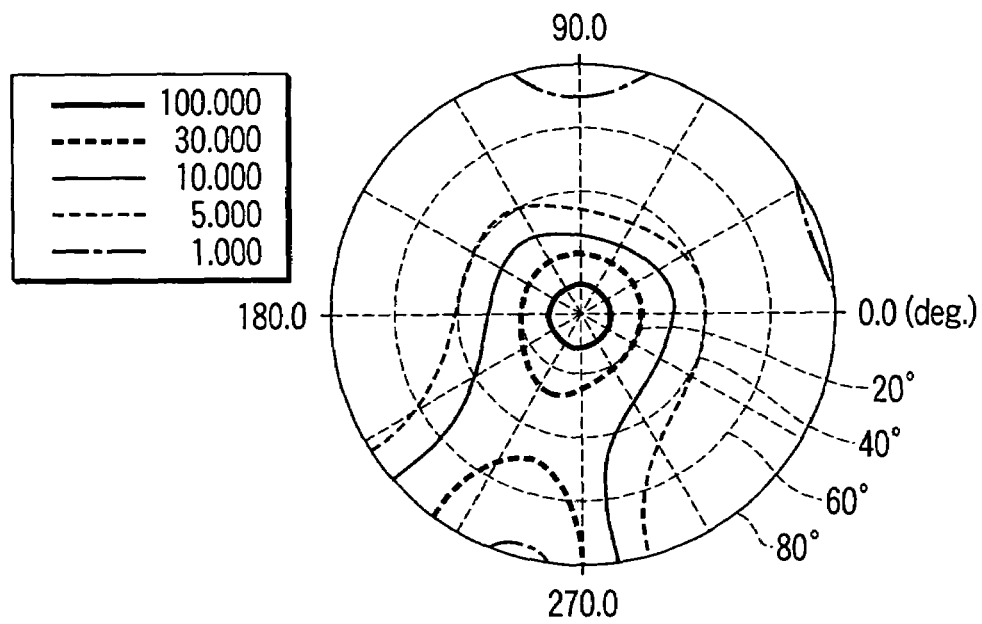
F I G. 21

| | |
|---|---|
| A | 1° |
| B | 36° |
| C | 89° |
| D | 144° |
| R VALUE OF FIRST PHASE PLATE | 145nm |
| R VALUE OF SECOND PHASE PLATE | 145nm |

| | | COMPARATIVE EXAMPLE 6 (TWO PHASE PLATES) | EMBODIMENT 5 (SINGLE PHASE PLATE) |
|---|---|---|---|
| | ELLIPTICITY | 0.67 | 0.67 |
| RE-FLECTION | REFLECTANCE | 9.70% | 9.70% |
| | CONTRAST | 15 | 14 |
| | HUE OF WHITE | (0.299, 0.317) | (0.301, 0.319) |
| TRANS-MISSION | TRANSMITTANCE | 5.20% | 5.20% |
| | CONTRAST | 120 | 120 |
| | HUE OF WHITE | (0.319, 0.338) | (0.320, 0.338) |

FIG. 23

LIQUID CRYSTAL DISPLAY DEVICE

CROSS-REFERENCE TO RELATED APPLICATIONS

This is a Continuation Application of PCT Application No. PCT/JP2004/005217, filed Apr. 12, 2004, which was published under PCT Article 21(2) in Japanese.

This application is based upon and claims the benefit of priority from prior Japanese Patent Application No. 2003-110516, filed Apr. 15, 2003, the entire contents of which are incorporated herein by reference.

BACKGROUND OF THE INVENTION

1. Field of the Invention

The present invention relates generally to a liquid crystal display device, and more particularly to a semi-transmission type liquid crystal display device wherein a single pixel includes a reflection section that displays an image using ambient light, and a transmission section that displays an image using backlight.

2. Description of the Related Art

In a semi-transmission type liquid crystal display device, a single pixel includes a reflection section with a reflective electrode, and a transmission section with a transmissive electrode. In a dark place, the semi-transmission type liquid crystal display device functions as a transmission-type liquid crystal display device that displays an image by selectively transmitting backlight using the transmission section within the pixel. In a light place, the semi-transmission type liquid crystal display device functions as a reflection-type liquid crystal display device that displays an image by selectively reflecting external ambient light using the reflection section within the pixel. Thereby, power consumption can greatly be reduced.

In the semi-transmission type liquid crystal display device, polarization control elements for controlling the polarization state of light are provided, respectively, on outer surfaces of an array substrate and a counter-substrate that constitute a liquid crystal display panel. Each of the polarization control elements is a circular polarization plate that is formed by combining a polarizer plate and two kinds of phase plates (i.e. a ½ wavelength plate that provides a phase difference of ½ wavelength between an ordinary ray and an extraordinary ray with respect to light of a predetermined wavelength, and a ¼ wavelength plate that provides a phase difference of ¼ wavelength between an ordinary ray and an extraordinary ray with respect to light of a predetermined wavelength). In short, each polarization control element controls the polarization state of light of a predetermined wavelength, which is incident on a liquid crystal layer, so that the light may become circularly polarized light.

A birefringent material, of which the phase plate is formed, has such characteristics that a refractive index no of the ordinary ray and refractive index ne of the extraordinary ray depend on wavelengths of light. Accordingly, a retardation value $\Delta n \cdot d$ of the phase plate (=$ne \cdot d - no \cdot d$; d is the thickness of the birefringent material in the direction of travel of light) depends on the wavelength of light that is transmitted. Accordingly, in a case where the polarization control element is composed of a polarizer plate and one kind of phase plate, circularly polarized light is produced only when light with a specified wavelength is incident on the polarization control element and a predetermined retardation (e.g. ¼ wavelength) is imparted to the polarization state of linearly polarized light that has passed through the polarizer plate. Hence, in order to produce circularly polarized light by imparting a predetermined retardation in the entire range of wavelengths that are used for color display, it is necessary to use a combination of at least two kinds of phase plates (½ wavelength plate and ¼ wavelength plate), thereby relaxing the wavelength dependency of the retardation value.

However, in the case of the semi-transmission type liquid crystal display device with this structure, reduction in thickness of the entire device cannot be realized due to the thickness of the polarization control element, and the manufacturing cost of the entire device is disadvantageously increased due to the polarization control element that requires a plurality of phase plates.

On the other hand, Jpn. Pat. Appln. KOKAI Publication No. 01-270024, for instance, proposes a transmission-type liquid crystal display device with a normally black display mode, wherein a polarization control element is formed by combining a polarizer plate and one kind of phase plate (¼ wavelength plate). According to this patent document, the polarization control element is used as a circular polarization plate, and the wavelength dependency is high as mentioned above. It is thus difficult to realize a polarization control element that can impart a predetermined retardation in the entire range of wavelengths that are used for color display, and it is not possible to obtain desired circularly polarized light. Consequently, even if the polarization control element as disclosed in the above-mentioned patent document is applied to the semi-transmission-type liquid crystal display device with a normally white display mode, optical characteristics such as reflectance, transmittance and contrast would considerably deteriorate.

BRIEF SUMMARY OF THE INVENTION

The present invention has been made in consideration of the above-described problems, and the object of the invention is to provide a liquid crystal display device with good optical characteristics, which can achieve reduction in thickness and manufacturing cost.

According to a first aspect of the present invention, there is provided a liquid crystal display device including a reflection section and a transmission section in each of a plurality of pixels arranged in a matrix, the device comprising:

a liquid crystal display panel in which a liquid crystal layer is held between a first substrate and a second substrate that are disposed to face each other;

a first polarization control element provided on an outer surface of the first substrate, which is opposed to a surface of the first substrate that holds the liquid crystal layer; and a second polarization control element provided on an outer surface of the second substrate, which is opposed to a surface of the second substrate that holds the liquid crystal layer, wherein the first polarization control element and the second polarization control element control a polarization state of light that passes therethrough, such that light in a polarization state of elliptically polarized light is to be incident on the liquid crystal layer, and an ellipticity of light with a wavelength of 550 nm, which is in the polarization state of elliptically polarized light, is between 0.5 and 0.85.

According to a second aspect of the present invention, a liquid crystal display device including a reflection section and a transmission section in each of a plurality of pixels arranged in a matrix, the device comprising:

a liquid crystal display panel in which a liquid crystal layer is held between a first substrate and a second substrate that are disposed to face each other;

a first polarization control element provided on an outer surface of the first substrate, which is opposed to a surface of the first substrate that holds the liquid crystal layer; and a second polarization control element provided on an outer surface of the second substrate, which is opposed to a surface of the second substrate that holds the liquid crystal layer, wherein each of the first polarization control element and the second polarization control element comprises one polarizer plate and one phase plate and controls a polarization state of light that passes therethrough, such that light in a polarization state of elliptically polarized light is to be incident on the liquid crystal layer.

BRIEF DESCRIPTION OF THE SEVERAL VIEWS OF THE DRAWING

FIG. 13 shows a comparison result of optical characteristics between Comparative Example 3 and Embodiment 2;

FIG. 14 shows angles of absorption axes and slow axes to the X axis in a first polarization control element and a second polarization control element that are applied to Embodiment 3, and retardation values of a first phase plate and a second phase plate;

FIG. 15 shows a comparison result of optical characteristics between Comparative Example 4 and Embodiment 3;

FIG. 18 shows angles of absorption axes and slow axes to the X axis in a first polarization control element and a second polarization control element that are applied to Embodiment 4, and retardation values of a first phase plate and a second phase plate;

FIG. 19 shows a comparison result of optical characteristics between Comparative Example 5 and Embodiment 4;

FIG. 20 shows an example of a distribution of ellipticity in relation to an angle Θ formed relative to a normal of the liquid crystal display device according to Embodiment 4;

FIG. 21 is a characteristic diagram showing the viewing-angle dependency of contrast in the liquid crystal display device according to Embodiment 4;

FIG. 22 shows angles of absorption axes and slow axes to the X axis in a first polarization control element and a second polarization control element that are applied to Embodiment 5, and retardation values of a first phase plate and a second phase plate;

FIG. 23 shows a comparison result of optical characteristics between Comparative Example 6 and Embodiment 5;

DETAILED DESCRIPTION OF THE INVENTION

A liquid crystal display device according to an embodiment of the present invention will now be described with reference to the accompanying drawings.

Figure 1:
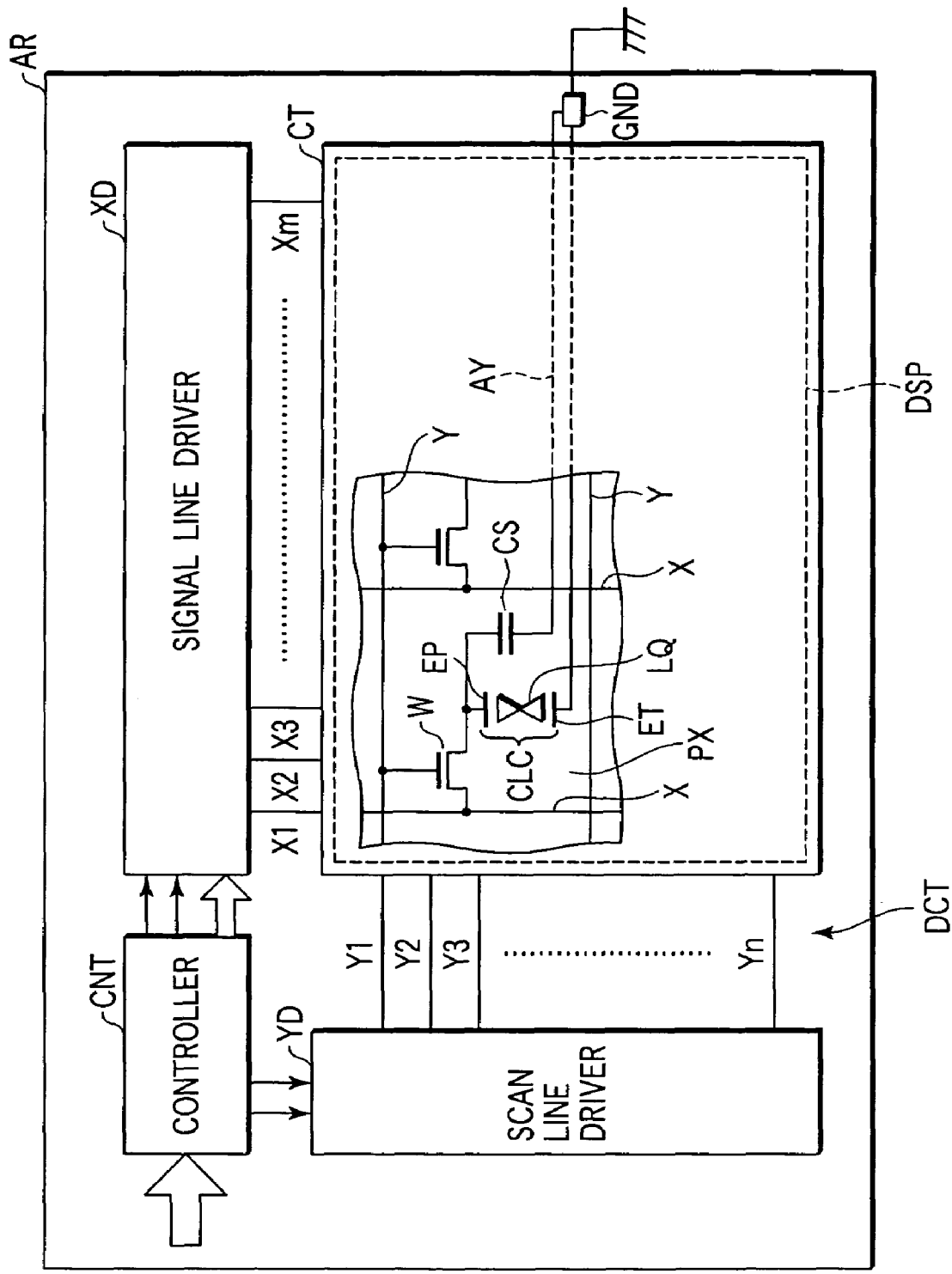
FIG. 1 schematically shows the structure of a liquid crystal display device according to an embodiment of the present invention.
Figure 2:
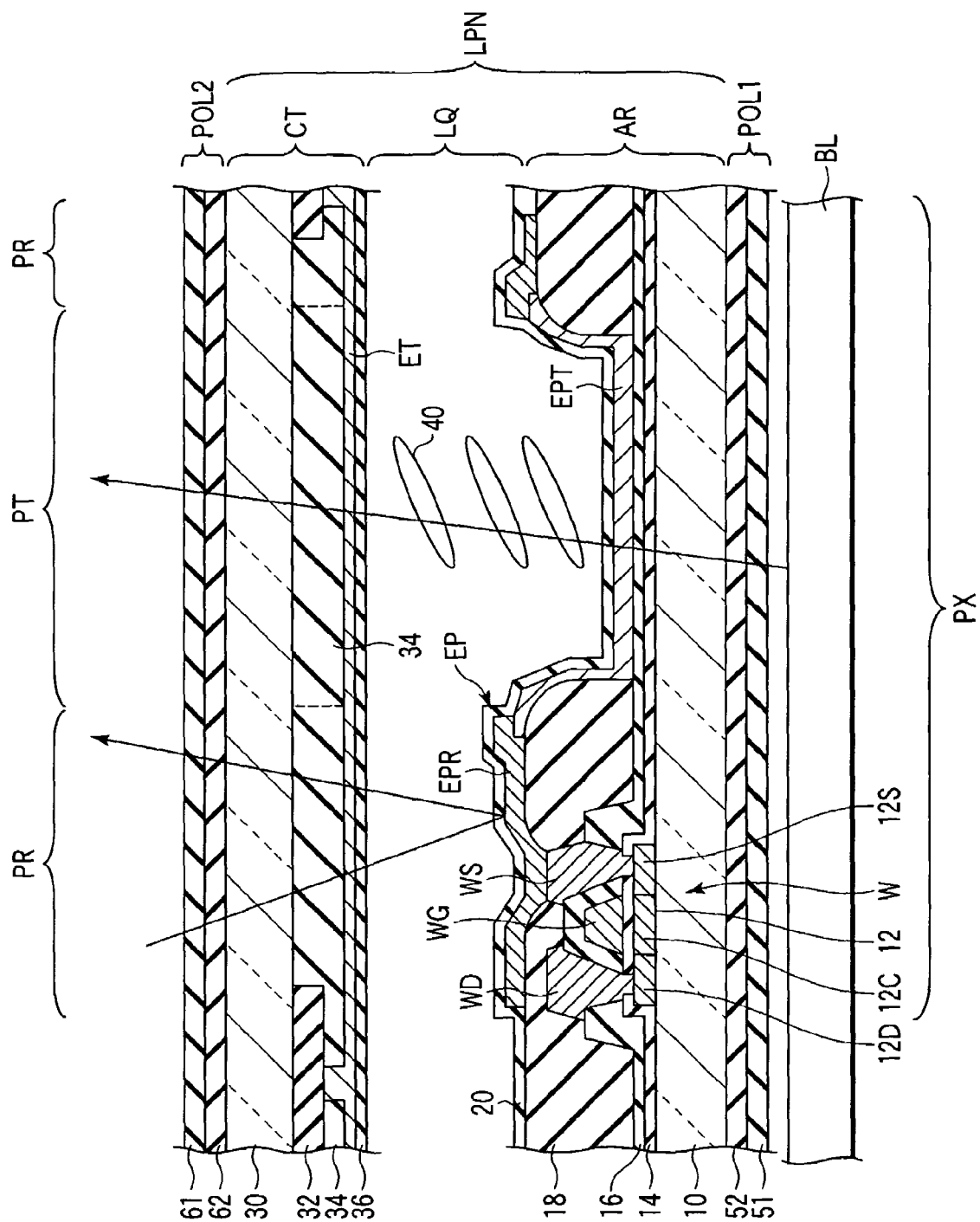
FIG. 2 schematically shows a cross-sectional structure of the liquid crystal display device shown in FIG. 1.

As is shown in FIG. 1 and FIG. 2, the liquid crystal display device is an active-matrix type semi-transmission color liquid crystal display device that includes a liquid crystal display panel LPN. The liquid crystal display panel LPN is configured to include an array substrate (first substrate) AR, a counter-substrate (second substrate) CT that is disposed to face the array substrate AR, and a liquid crystal layer LQ that is held between the array substrate AR and counter-substrate CT.

The liquid crystal display device further includes a first polarization control element POL1 that is provided on an outer surface of the array substrate AR, which is opposed to the surface thereof holding the liquid crystal layer LQ, and a second polarization control element POL2 that is provided on an outer surface of the counter-substrate CT, which is opposed to the surface thereof holding the liquid crystal layer LQ. In addition, the liquid crystal display device includes a backlight unit BL that illuminates the liquid crystal display panel LPN from the first polarization control element POL1 side.

In the liquid crystal display device, a display region DSP that displays an image includes a plurality (m×n) of pixels PX arranged in a matrix. Each pixel PX includes a reflection section PR that displays an image by selectively reflecting external ambient light, and a transmission section PT that displays an image by selectively transmitting backlight from the backlight unit BL.

The array substrate AR is formed using an insulating substrate 10 with light transmissivity, such as a glass substrate or a quartz substrate. Specifically, the array substrate AR includes, within the display region DSP, an (m×n) number of pixel electrodes EP arranged in association with the respective pixels; an n-number of scan lines Y (Y1 to Yn) formed in a row direction of the pixel electrodes EP; an m-number of signal lines X (X1 to Xm) formed in a column direction of the pixel electrodes EP; an (m×n) number of switching elements W, i.e. thin-film transistors, arranged near intersections between the scan lines Y and signal lines X in the respective pixels PX; and auxiliary capacitance lines AY, each of which is capacitive-coupled to the associated pixel electrode EP so as to constitute an auxiliary capacitance CS in parallel to a liquid crystal capacitance CLC, and is formed substantially in parallel to the n-number of scan lines Y.

In a drive circuit region DCT near the display region DSP, the array substrate AR includes at least parts of a scan line driver YD that is connected to the n-number of scan lines Y and a signal line driver XD that is connected to the m-number of signal lines X. The scan line driver YD successively supplies scan signals (drive signals) to the n-number of scan lines Y under the control of a controller CNT. The signal line driver XD supplies video signals (drive signals) to the m-number of signal lines X under the control of the controller CNT at a timing when the switching elements W in each row are turned on by the scan signal. Thereby, the pixel electrodes EP in each row are set at pixel potentials corresponding to the video signals that are supplied via the associated switching elements W.

Each of the switching elements W is an N-channel thin-film transistor and includes a polysilicon semiconductor layer 12 that is disposed on the insulating substrate 10. The polysilicon semiconductor layer 12 includes a source region 12S and a drain region 12D, and a channel region 12C that is sandwiched between the source region 12S and drain region 12D. The polysilicon semiconductor layer 12 is covered with a gate insulation film 14.

A gate electrode WG of the switching element W is connected to the associated scan line Y (or formed integral with the associated scan line Y). The gate electrode WG is disposed on the gate insulation film 14 along with the scan line Y and auxiliary capacitance line AY. The gate electrode WG, scan line Y and auxiliary capacitance line AY are covered with an interlayer insulation film 16.

A source electrode WS of the thin-film transistor W is connected to the associated pixel electrode EP and is put in contact with the source region 12S of the polysilicon semiconductor layer 12. A drain electrode WD of the thin-film transistor W is connected to the associated signal line X (or formed integral with the associated signal line X) and is put in contact with the drain region 12D of polysilicon semiconductor layer 12. The source electrode WS, drain electrode WD and signal line X are covered with an organic insulation film 18.

The pixel electrode EP includes a reflective electrode EPR that is provided in association with the reflection section PR, and a transmissive electrode EPT that is provided in association with the transmission section PT. The reflective electrode EPR is disposed on the organic insulation film 18 and is electrically connected to the source electrode WS. The reflective electrode EPR is formed of a metallic reflective film with light reflectivity, such as an aluminum film. The transmissive electrode EPT is disposed on the interlayer insulation film 16 and is electrically connected to the reflective electrode EPR. The transmissive electrode EPT is formed of a metallic film with light transmissivity, such as an indium tin oxide (ITO) film. Pixel electrodes EP associated with all pixels PX are covered with an orientation film 20.

On the other hand, the counter-electrode CT is formed using an insulating substrate 30 with light transmissivity, such as a glass substrate or a quartz substrate. Specifically, the counter-electrode CT includes, in the display region DSP, a black matrix 32 that defines the individual pixels PX, color filters 34 that are disposed in the respective pixels defined by the black matrix 32, and a single counter-electrode ET.

The black matrix 32 is disposed to be opposed to the wires, such as scan lines Y and signal lines X, provided on the array substrate AR. The color filters 34 are formed of color resins of a plurality of colors, for instance, three primary colors of red, blue and green. The red colored resin, blue colored resin and green colored resin are disposed in association with the red pixel, blue pixel and green pixel, respectively.

The color filter 34 may be formed to have different optical densities at the reflection section PR and the transmission section PT. In the reflection section PR, ambient light, which contributes to effecting display, passes through the color filter 34 twice. In the transmission section PT, backlight, which contributes to effecting display, passes through the color filter 34 only once. Thus, in order to adjust the hues in the reflection section PR and transmission section PT, it is preferable to reduce the optical density of the colored resin in the reflection section PR to about half the optical density of the colored resin in the transmission section PT.

The counter-electrode ET is disposed to face the pixel electrodes EP of all pixels PX. The counter-electrode ET is formed of a metallic film with light transmissivity, such as an indium tin oxide (ITO) film, and is electrically connected to the auxiliary capacitance line AY. In addition, the counter-electrode ET is covered with an orientation film 36.

When the counter-substrate CT and the array substrate AR are disposed such that the orientation films 20 and 36 face each other, a predetermined gap is provided between both substrates by a spacer (not shown). Specifically, the gap provided in the reflection section PR is about half the gap in the transmission section PT. In this embodiment, the gap in the reflection section PR is set at about 2.5 µm, and the gap in the transmission section PT is set at about 4.8 µm.

The liquid crystal layer LQ is formed of a liquid crystal composition including liquid crystal molecules 40, which is sealed in the gap between the orientation film 20 of the array substrate AR and the orientation film 36 of the counter-substrate CT. In this embodiment, MJ981594 (manufactured by Merck & Co., $\Delta n=0.065$) is used as the liquid crystal composition, and the twist angle of liquid crystal molecules 40 is set at 0 deg.

Each of the first polarization control element POL1 and second polarization control element POL2 controls the polarization state of light that passes therethrough. To be more specific, the first polarization control element POL1 controls the polarization state of light that passes therethrough so that light in a polarization state of elliptically polarized light may be incident on the liquid crystal layer LQ. Thus, the polarization state of backlight, which is incident on the first polarization control element POL1, is changed to elliptic polarization. The backlight, which emanates from the first polarization control element POL1, enters the liquid crystal layer LQ while maintaining the elliptically polarized state.

Similarly, the second polarization control element POL2 controls the polarization state of light that passes therethrough so that light in a polarization state of elliptically polarized light may be incident on the liquid crystal layer LQ. Thus, the polarization state of ambient light, which is incident on the second polarization control element POL2, is changed to elliptic polarization. The ambient light, which emanates from the second polarization control element POL2, enters the liquid crystal layer LQ while maintaining the elliptically polarized state.

The first polarization control element POL1 comprises at least one first polarizer plate 51 and at least one first phase plate 52. The second polarization control element POL2 comprises at least one second polarizer plate 61 and at least one second phase plate 62. Each of the first phase plate 52 and second phase plate 62 is a so-called ¼ wavelength plate that provides a phase difference of ¼ wavelength between an ordinary ray and an extraordinary ray with respect to light of a predetermined wavelength.

The polarizer plate used in this embodiment has an absorption axis and a transmission axis, which are perpendicular to each other, in a plane that intersects at right angles with the direction of travel of light. The polarizer plate extracts light with a plane of vibration in one direction parallel to the transmission axis, from light with planes of vibration in random directions. That is, the polarizer plate extracts light in a linearly polarized state.

The phase plate used in this embodiment has a slow axis and a fast axis that intersect at right angles. In discussion of birefringence, the slow axis corresponds to an axis with a relatively high refractive index, and the fast axis corresponds to an axis with a relatively low refractive index. It is assumed that the slow axis agrees with a plane of vibration of an ordinary ray, and the fast axis agrees with a plane of vibration of an extraordinary ray. A retardation value Δn·d (nm) of the phase plate is defined by ti (ne·d−no·d)

where no is the refractive index of the ordinary ray, ne is the refractive index of the extraordinary ray, and d is the thickness of the phase plate in the direction of travel of light.

In the description below, the positions of the polarizer plates 51 and 61 are specified by an absorption axis 51T and an absorption axis 61T, respectively. The positions of the phase plates 52 and 62 are specified by slow axes 52D and 62D, respectively.

Figures 3, 4:
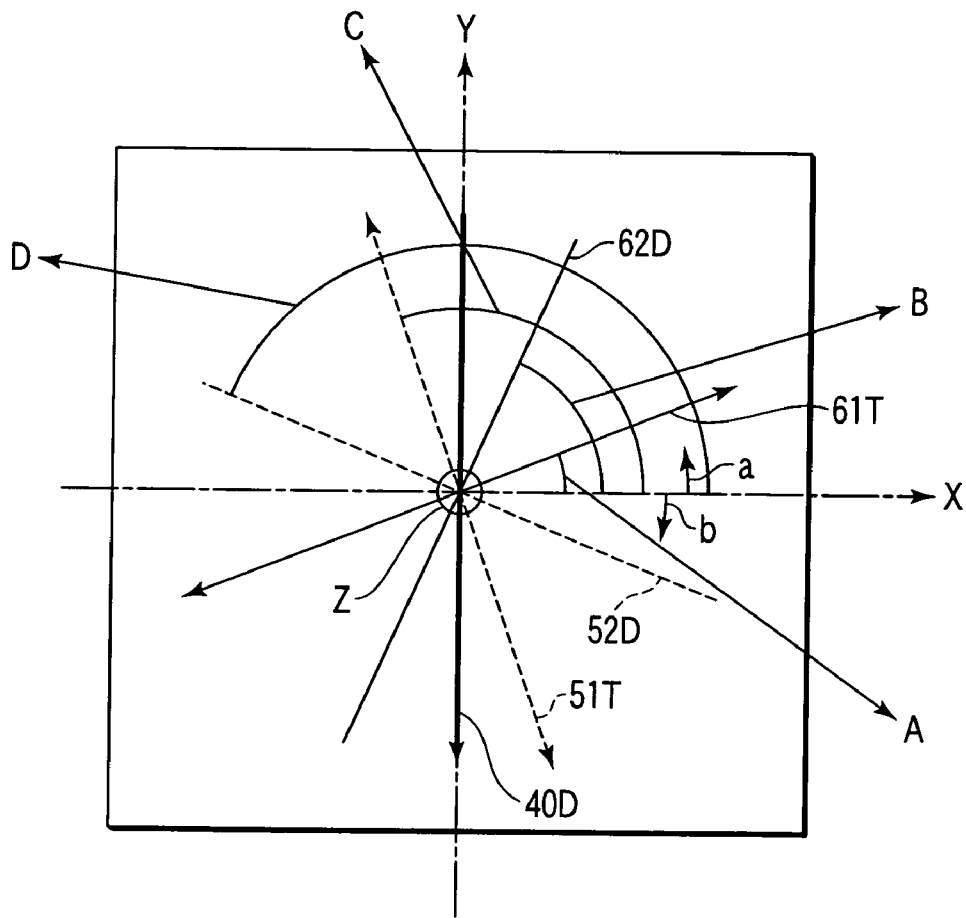
FIG. 3 is a view for explaining a positional relationship between a director of liquid crystal molecules, absorption axes of first and second polarizer plates, and slow axes of first and second phase plates in the liquid crystal display device shown in FIG. 2.
FIG. 4 shows angles of absorption axes and slow axes to an X axis in a first polarization control element and a second polarization control element that are applied to Embodiment 1, and retardation values of a first phase plate and a second phase plate.

As is shown in FIG. 3, when the liquid crystal display device according to the present embodiment is viewed from the counter-substrate side, an X axis and a Y axis, which intersect at right angles, are defined, for the sake of convenience, in a plane parallel to the major surface of the counter-substrate CT. In the case where the liquid crystal layer LQ is formed of a liquid crystal composition including homogeneously oriented liquid crystal molecules 40, a director 40D of liquid crystal molecules 40 is set to be the Y axis.

The second polarizer plate 61 is disposed at an angle A (deg) that is defined between the absorption axis 61T of the second polarizer plate 61 and the X axis. The second phase plate 62 is disposed at an angle B (deg) that is defined between the slow axis 62D of the second phase plate 62 and the X axis. The first polarizer plate 51 is disposed at an angle C (deg) that is defined between the absorption axis 51T of the first polarizer plate 51 and the X axis. The first phase plate 52 is disposed at an angle D (deg) that is defined between the slow axis 52D of the first phase plate 52 and the X axis.

In the present embodiment, as shown in FIG. 4, the formed angle A is 1° and the formed angle B is 38°. Accordingly, an acute angle θ2 formed between the absorption axis 61T of the second polarizer plate 61 and the slow axis 62D of the second phase plate 62 is 37°. In addition, the formed angle C is 100°, and the formed angle D is 155°. Thus, an acute angle θ1 formed between the absorption axis 51T of the first polarizer plate 51 and the slow axis 52D of the first phase plate 52 is 55°. The retardation value (R value) of the first phase plate 52 is 160 nm with respect to light with a wavelength of 550 nm. The retardation value (R value) of the second phase plate 62 is 140 nm with respect to light with a wavelength of 550 nm.

The formed angles A to D and the retardation values of the first phase plate 52 and second phase plate 62 vary depending on retardation values in a voltage-off state in which no potential difference is applied between the pixel electrode EP and counter-electrode ET of the liquid crystal display panel LPN, or residual retardation values in a voltage-on state in which a potential difference is applied between the pixel electrode EP and counter-electrode ET. Thus, these values are not limited to those shown in FIG. 4.

The first polarization control element POL1 and second polarization control element POL2 are configured such that the acute angle θ between the absorption axis of the polarizer plate 51, 61 and the slow axis of the phase plate 52, 62 may fall within a predetermined range.

In general, in a semi-transmission type color liquid crystal display with a normally white display mode, circular polarization is normally adopted as the polarization state of light that is incident on the liquid crystal display panel LPN. In other words, it is necessary to make polarized light, which has an ellipticity (=minor-axis direction amplitude/major-axis direction amplitude) close to 1, incident on the liquid crystal display panel LPN.

However, the retardation values of the phase plates included in the first polarization control element POL1 and second polarization control element POL2 vary depending on the wavelength of light that passes therethrough. Hence, in order to produce circularly polarized light by imparting a predetermined retardation (e.g. ¼ wavelength) to light in the entire range of wavelengths (e.g. 450 nm to 650 nm) that are used for color display, it is necessary to relax the wavelength dependency of the retardation values of the first polarization control element POL1 and second polarization control element POL2.

The wavelength dependency of the retardation value can be relaxed by composing the polarization control element of a combination of a polarizer plate and at least two kinds of phase plates (½ wavelength plate and ¼ wavelength plate). Specifically, as is indicated by a curve (a) in FIG. 5, the polarization control element, which is formed by combining a polarizer plate and at least two kinds of phase plates (½ wavelength plate and ¼ wavelength plate), is capable of providing a substantially equal, high ellipticity with respect to light in the entire range of wavelengths of 450 nm to 650 nm. In short, by using the polarization control element with this structure, light that is close to circularly polarized light can be obtained irrespective of the wavelength of light that passes.

However, when the polarization control element with this structure is employed, reduction in thickness of the entire device is difficult to achieve and the manufacturing cost of the entire device increases. If the polarization control element that is formed by combining a polarizer plate and one kind of phase plate (¼ wavelength plate) is employed in order to cope with the problem, reduction in thickness and cost can be achieved but desired optical characteristics cannot be obtained. In the case of the polarization control element with this structure, as indicated by a curve (b) in FIG. 5, ellipticity deteriorates considerably on the short wavelength side due to the wavelength dependency of the retardation value of the ¼ wavelength plate, even if the polarization control element is configured so as to be able to obtain substantially the same ellipticity with respect to light with a wavelength of 550 nm as in the case of using the polarization control element that is formed by combining a ½ wavelength plate and a ¼ wavelength plate.

The optical characteristics of Comparative Example 1 and Comparative Example 2 were compared. Comparative Example 1 is a liquid crystal display device having a polarization control element that includes two kinds of phase plates (½ wavelength plate and ¼ wavelength plate). Comparative Example 2 is a liquid crystal display device having a polarization control element that includes only one kind of phase plate (¼ wavelength plate).

Figures 5, 6:
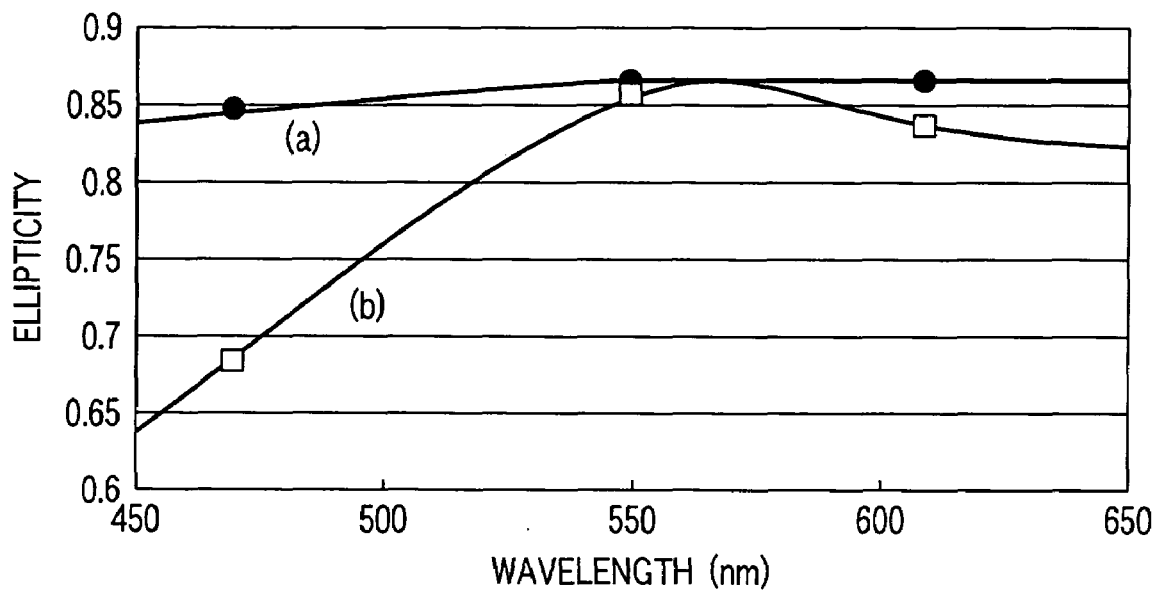
FIG. 5 shows an example of a distribution of ellipticity of elliptically polarized light, which is obtained by the polarization control element, in relation to wavelengths.
FIG. 6 shows a comparison result of optical characteristics between Comparative Example 1 and Comparative Example 2, which are formed using the polarization control element having the wavelength dependency of ellipticity as shown in FIG. 5.

As shown in FIG. 6, Comparative Example 1 and Comparative Example 2 are configured such that a substantially equal, high ellipticity of 0.88 can be obtained with respect to light with a wavelength of 550 nm. In Comparative Example, 1, the reflection section had a reflectance of 7%. In Comparative Example 2, the reflection section had a reflectance of 6.3%, which is lower by 10%. The measured reflectance corresponds to a ratio of the intensity of reflective light from the reflection section to the intensity of white ambient light (incident light) that is made incident from the counter-substrate side of the liquid crystal display device. The reflectance was measured by means of a reflectometer CM-508D (manufactured by MINOLTA). The incident light is diffuse light that is incident in a direction substantially perpendicular to the counter-substrate (normal direction of the counter-substrate). The intensity of reflective light was measured by a detector that was disposed at a position with an inclination of 8° from the normal of the counter-substrate.

In Comparative Example 1, the contrast was 25. In Comparative Example 2, the contrast was 8 and decreased remarkably. The contrast was measured by a measuring device BM-5A (manufactured by TOPCON Corp.) in a darkroom.

In Comparative Example 1, the hue of white was (x, y)=(0.319, 0.339) on the chromaticity coordinates. In Comparative Example 2, the hue of white was (x, y)=(0.333, 0.358) on the chromaticity coordinates, and was shifted to an yellow-coloring side. The hue (chromaticity coordinates values) was measured in parallel with the measurements using the above-mentioned measuring devices.

As has been described above, in the case of the polarization control element including only one kind of phase plate (¼ wavelength plate), a polarization state with a high ellipticity that is very close to circular polarization can be created with respect to light of specified wavelengths, but the ellipticity for light with other wavelengths deteriorates considerably due to the wavelength dependency of the retardation value in the phase plate. In particular, deterioration in optical characteristics becomes more serious in accordance with an increase in the difference between a maximum value and a minimum value of ellipticity in the range of measured wavelengths.

The semi-transmission type liquid crystal display device according to the present embodiment is characterized in that light, which is in a circular polarization state or in a polarization state with a high ellipticity close to circular polarization, is not utilized, but light, which is in an elliptical polarization state with an ellipticity within a predetermined range, is positively utilized. Specifically, if attention is paid to the object to achieve reduction in thickness and cost, it is preferable that the polarization control element, which is applied to the semi-transmission type liquid crystal display device, be composed of a polarizer plate and one kind of phase plate (¼ wavelength plate). On the other hand, if attention is paid to the object to achieve good optical characteristics, in particular, in reflective display, it is preferable that a polarization state with an ellipticity in a predetermined range be created for the light in the entire range of wavelengths of, e.g. 450 nm to 650 nm that are used for color display.

It is thus desirable to form the polarization control element by combining a polarizer plate and one kind of phase plate (¼ wavelength plate) in order not to obtain a very high ellipticity close to circular polarization for only light with a specified wavelength, but to obtain a substantially uniform ellipticity for light in the range of wavelengths of 450 nm to 650 nm.

In this case, use is made of the features: (1) the polarization state of light, which passes through the polarization control element, varies depending on the angle θ (deg) formed between the slow axis of the phase plate and the absorption axis of the polarizer plate that constitute the polarization control element, and the ellipticity of elliptically polarized light that is produced by the polarization control element varies depending on the angle θ, and (2) the phase plate, i.e. the ¼ wavelength plate, of the polarization control element that is employed in this embodiment has a retardation value that varies depending on the wavelength of light that passes therethrough ("wavelength dependency of retardation value").

Figure 7:
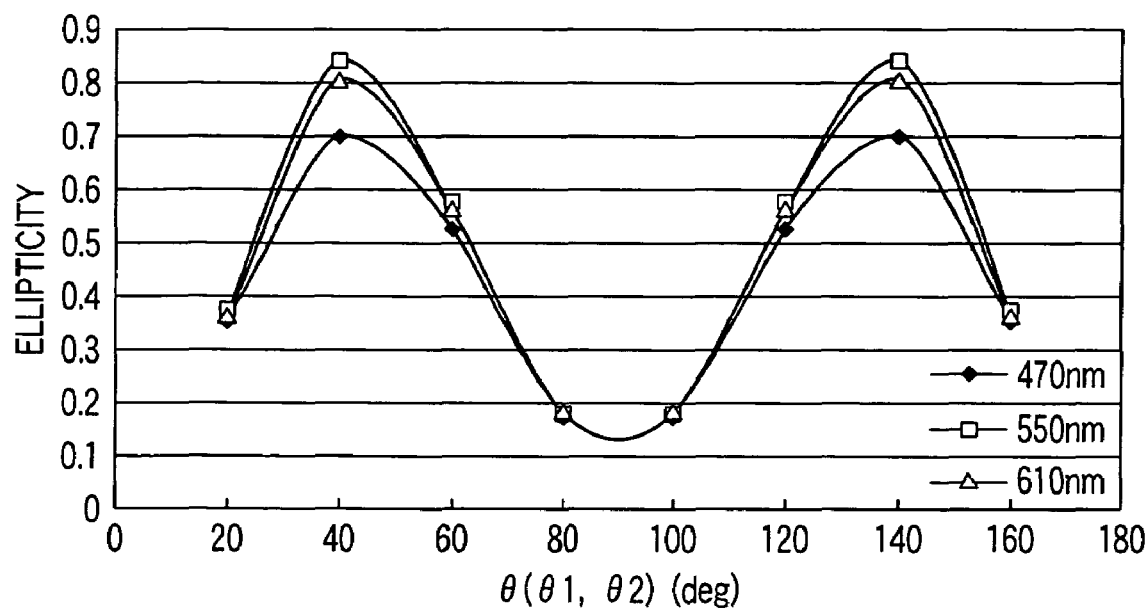
FIG. 7 shows an example of a distribution of ellipticity of elliptically polarized light, which is produced by the polarization control element, in relation to a formed angle θ.
Figure 8:
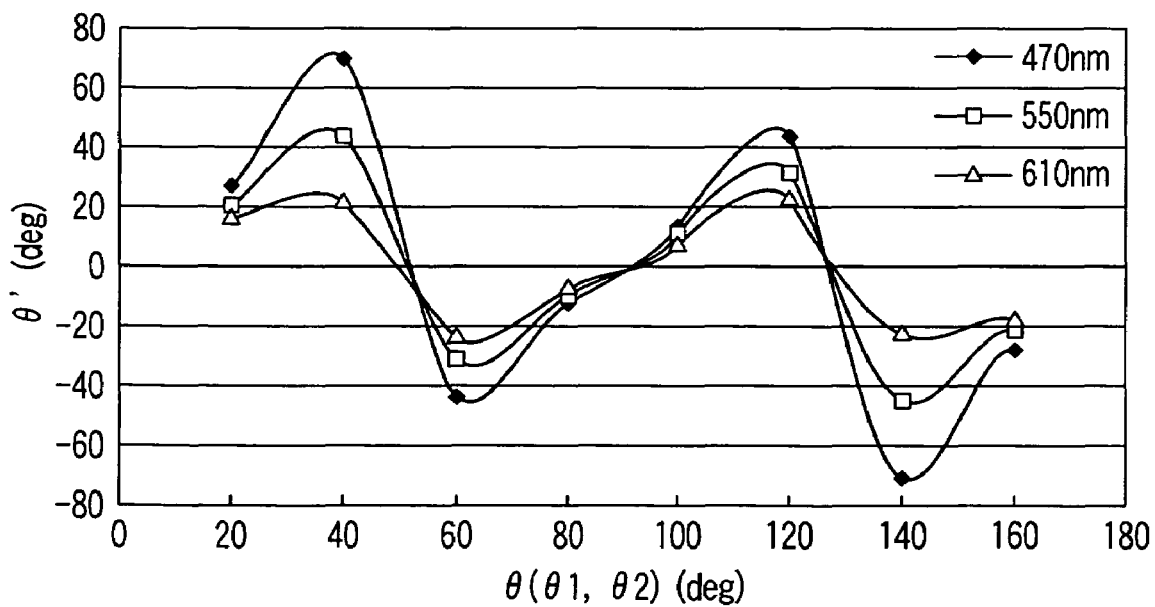
FIG. 8 shows an example of a distribution of an angle θ' formed between a major axis of elliptically polarized light and the X axis, in relation to the angle θ.

Variations of ellipticity of elliptically polarized light, which is produced by the polarization control element, relative to the angle θ (deg), were simulated with respect to light with a wavelength of 470 nm as a typical wavelength of blue light for color display, light with a wavelength of 550 nm as a typical wavelength of green light and light with a wavelength of 610 nm as a typical wavelength of red light. According to simulation results, as shown in FIG. 7, it was confirmed that different distributions were obtained with wavelengths of light that passes through the polarization control element. In addition, variations of the acute angle θ' (deg) formed between the major axis of elliptically polarized light, which is produced by the polarization control element, and the X axis relative to the angle θ (deg), were simulated. According to simulation results, as shown in FIG. 8, it was confirmed that different distributions were obtained with wavelengths of light that passes through the polarization control element. The positive (+) sign of the acute angle θ' indicates an angle formed counterclockwise (arrow a) in FIG. 3, and the negative (−) sign of the acute angle θ' indicates an angle formed clockwise (arrow b) in FIG. 3.

In the example shown in FIG. 7, as regards the light with the wavelength of 550 nm, a variation of ellipticity relative to the angle θ is relatively large, and a maximum ellipticity of about 0.85 is obtained. Similarly, as regards the light with the wavelength of 610 nm, a variation of ellipticity relative to the angle θ is relatively large, and a maximum ellipticity of about 0.85 is obtained. By contrast, as regards the light with the wavelength of 470 nm, a variation of ellipticity relative to the angle θ is relatively small, and an ellipticity of about 0.7 at most is obtained.

Referring to the example shown in FIG. 7, when a maximum ellipticity (about 0.85) is to be obtained with respect to light with the wavelength of 550 nm at the angle θ=45°, only an ellipticity of about 0.7 at most is obtainable with respect to light with the wavelength of 470 nm. The difference in ellipticity is about 0.15, and deterioration occurs in optical characteristics, as described in connection with Comparative Example 2.

On the other hand, in cases where the angle θ is an acute angle less than 40° or greater than 45°, the difference in ellipticity obtained for light with the respective wavelengths can be set at less than 0.15. This means that a polarization state with a substantially uniform ellipticity can be created for light in the entire range of wavelengths (e.g. 450 nm to 650 nm) that are used for color display. Thus, a tendency of improvement in optical characteristics is observed.

More preferably, by setting the angle θ at an acute angle of 30° or less or 50° or more, it becomes possible to create a polarization state with a difference in ellipticity of 0.1 or less with respect to the light in the entire range of wavelengths (e.g. 450 nm to 650 nm) that are used for color display. Further improvement in optical characteristics is expectable.

In the case where the polarization control element with the above-described structure is applied to the liquid crystal display device according to the present embodiment, the angle θ in the polarization control element is set at an acute angle less than 40° or greater than 45°, and more preferably at an acute angle of 30° or less or 50° or more. Thereby, the difference between the maximum value and minimum value of the ellipticity of light in the wavelength range of 450 nm to 650 nm, which is incident on the liquid crystal layer in an elliptical polarization state, can be set at less than 0.15, preferably 0.1 or less. Hence, the optical characteristics can be improved, and a good display quality is realized.

If attention is paid to green light having a relatively high luminosity factor, e.g. light with a wavelength of 550 nm, in the case where the ellipticity of elliptically polarized light that is produced through the polarization control element is 0.65 or less, the difference in ellipticity from light with other wavelengths can be decreased (that is, the wavelength dependency can be reduced). However, in the liquid crystal display device with this polarization control element, the reflectance of the reflection section considerably deteriorates. In particular, if the ellipticity is lower than 0.5, the reflectance of the reflection section lowers by 10% or more and the quality of an image, which is displayed when the display device is used as a reflection-type liquid crystal display, considerably deteriorates.

Similarly, as regards the light with the wavelength of 550 nm, in the case where the ellipticity of elliptically polarized light that is produced through the polarization control element is 0.8 or more, the wavelength dependency increases as mentioned above and the difference in ellipticity from light with other wavelengths increases up to about 0.15. In particular, when the ellipticity is over 0.85, the hue of white, which is displayed when the display device is used as a reflection-type liquid crystal display, becomes yellowish and the quality of a displayed image considerably deteriorates.

As has been described above, in order to set the ellipticity of light with a wavelength of 550 nm between 0.5 and 0.85, the angle θ in the polarization control element is set between 25° and 65°. Preferably, in order to set the ellipticity of light with a wavelength of 550 nm between 0.65 and 0.8, the angle θ in the polarization control element is set between 28° and 40° or between 48° and 57°.

In the case where the polarization control element with the above-described structure is applied to the liquid crystal display device of the present embodiment, the angle θ in the polarization control element is set in the above ranges. It thus becomes possible to set the ellipticity of light with a wavelength of 550 nm, which is incident on the liquid crystal layer in an elliptical polarization state, between 0.5 and 0.85, and preferably between 0.65 and 0.8. Hence, the optical characteristics can be improved, and a good display quality is realized.

Taking the above into account, the angle θ in the first polarization control element POL1 and second polarization control element POL2 is set in the range between 25° and 65°. In consideration of the difference in ellipticity (less than 0.15) and the ellipticity of light with the wavelength of 550 nm (0.5 or more and 0.85 or less), it is desirable that the angle θ be set in a range that is not less than 25° and is less than 40° or in a range that is greater than 45° and is not greater than 65°.

In the present embodiment, importance is placed on the improvement in reflection characteristics of the reflection section, that is, the reflectance and contrast. From this standpoint, the angle θ2, which is formed between the absorption axis 61T of second polarizer plate 61 and the slow axis 62D of second phase plate 62 in the second polarization control element POL2, is first optimized. Specifically, the ellipticity of light, which has passed through the second polarizer plate 61 and second phase plate 62, is set between 0.5 and 0.85, and the difference between the maximum value and minimum value of ellipticity in the wavelength range between 450 nm and 650 nm is set at less than 0.15. That is, in this embodiment, the angle θ2 in the second polarization control element POL2 is set at 37°, as has been described above.

Subsequently, the angle θ1, which is formed between the absorption axis 51T of first polarizer plate 51 and the slow axis 52D of first phase plate 52 in the first polarization control element POL1, is optimized. Specifically, the angle θ1 is set under such a condition that a polarization state of an inverse matrix (original-point symmetry on a Poincare sphere) is created, relative to the polarization state of light that has passed through the second polarizer plate 61 and second phase plate 62. In this embodiment, the angle θ1 in the first polarization control element POL1 is set at 55°, as has been described above.

Figures 9, 10:
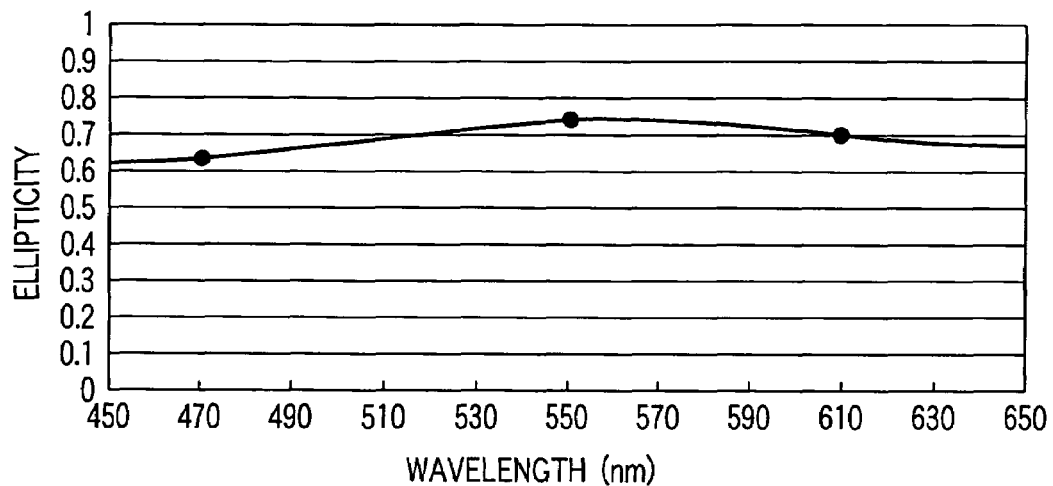
FIG. 9 shows an example of a distribution of ellipticity of elliptically polarized light, which is obtained by the polarization control element applied to Embodiment 1, in relation to wavelengths.
FIG. 10 shows a comparison result of optical characteristics between Comparative Example 1 and Embodiment 1.

As is shown in FIG. 9, with the second polarization control element POL2 that is applied here, a substantially equal ellipticity is obtained in the entire wavelength range of 450 nm to 650 nm, and it is possible to obtain elliptically polarized light in a polarization state with a substantially equal ellipticity regardless of the wavelength of light that passes therethrough (the difference between the maximum value and minimum value of ellipticity in the entire wavelength range is about 0.1). With the first polarization control element POL1, too, characteristics that are substantially equal to those of the second polarization control element POL2 as shown in FIG. 9 can be obtained.

According to the present embodiment, the first polarization control element POL1 and second polarization control element POL2 can control the polarization state of light that passes therethrough, and can produce elliptically polarized light that enters the liquid crystal layer LQ. In addition, the ellipticity of light with the wavelength of 550 nm, which is incident on the liquid crystal layer LQ in an elliptical polarization state, can be set between 0.5 and 0.85. Furthermore, according to this embodiment, the ellipticity of light in the wavelength range of 450 nm to 650 nm, which is incident on the liquid crystal layer LQ, can be made substantially uniform, and the difference between the maximum value and minimum value of ellipticity can be set at less than 0.15.

The optical characteristics of Embodiment 1, which is a liquid crystal display device including the optimized first polarization control element POL1 and second polarization control element POL2, were compared with the optical characteristics of the above-described Comparative Example 1. Both Comparative Example 1 and Embodiment 1 are configured as semi-transmission type liquid crystal display devices with a normally white display mode.

A detailed description is given of the operations in reflection display and transmission display in the semi-transmission type liquid crystal display device whose display mode is a normally white mode.

Light, which passes through the liquid crystal layer LQ in the reflection section PR, behaves in the following manner in a voltage-off state in which no potential difference is applied to the liquid crystal layer LQ. Incident ambient light from the counter-substrate CT side passes through the second polarization control element POL2 and is converted to polarized light that is, for example, elliptically polarized clockwise. The elliptically polarized light enters the liquid crystal layer LQ via the counter-substrate CT. While passing through the liquid crystal layer LQ, the elliptically polarized light is provided with a phase difference of $\pi/2$, and reaches the reflective electrode EPR. Reflective light from the reflective electrode EPR is given a phase difference of $\pi$ at this point of time. While passing through the liquid crystal layer LQ, the reflective light is provided with a phase difference of $\pi/2$ once again. In short, a phase difference of $2\pi$ is imparted to the elliptically polarized light, which has traveled through the liquid crystal layer LQ in the forward and backward directions. Accordingly, the reflective light from the reflection section PR passes through the counter-substrate CT while maintaining the state of clockwise elliptically polarized light. Since the elliptically polarized light can pass through the second polarization control element POL2, it contributes to single-color light display corresponding to the color of the color filter 34.

On the other hand, light, which passes through the liquid crystal layer LQ in the reflection section PR, behaves in the following manner in a voltage-on state in which a potential difference is applied to the liquid crystal layer LQ. Like the voltage-off state, incident ambient light from the counter-substrate CT side passes through the second polarization control element POL2 and is converted to polarized light that is, for example, elliptically polarized clockwise. The elliptically polarized light enters the liquid crystal layer LQ via the counter-substrate CT. When the residual retardation in the liquid crystal layer LQ at the voltage-on time is 0, the elliptically polarized light undergoes no effect of a phase difference while passing through the liquid crystal layer LQ. Thus, the elliptically polarized light reaches the reflective electrode EPR in the unchanged polarized state. Reflective light from the reflective electrode EPR is given a phase difference of $\pi$ at this point of time, similarly with the above-described case. While passing through the liquid crystal layer LQ once again, the reflective light undergoes no effect of a phase difference. Hence, a phase difference of $\pi$ is imparted to the elliptically polarized light, which has traveled through the liquid crystal layer LQ in the forward and backward directions. Accordingly, the reflective light from the reflection section PR passes through the counter-substrate CT in the state of counterclockwise elliptically polarized light. This elliptically polarized light does not pass through the second polarization control element POL2. Thus, dark display, that is, black display, is effected.

In the case where a voltage is applied to the liquid crystal layer LQ, liquid crystal molecules at an interface of the substrate are not completely erected due to anchoring forces. Consequently, in usual cases, the residual retardation in the liquid crystal layer LQ at the voltage-on time is not 0, but is several to several-ten nm. In this case, if the retardation value of the second phase plate 62 of the second polarization control element POL2 is decreased by a degree corresponding to the residual retardation of the liquid crystal layer LQ, the polarized state of light that reaches the reflective electrode EPR becomes equal to the state in the case where the residual retardation in the liquid crystal layer LQ is 0. Therefore, black display can be executed with the same mechanism as described above.

As has been described above, in the reflection section PR, ambient light is selectively reflected to display an image.

Light, which passes through the liquid crystal layer LQ in the transmission section PT, behaves in the following manner in a voltage-off state. Backlight emitted from the backlight unit BL passes through the first polarization control element POL1 and is converted to polarized light that is, for example, elliptically polarized counterclockwise. The elliptically polarized light enters the liquid crystal layer LQ via the array substrate AR. While passing through the liquid crystal layer LQ at the transmission section PT having about double the gap of the reflection section PR, the elliptically polarized light is provided with a phase difference of $\pi$. That is, the light, which has passed through the transmission section PT, is converted to clockwise elliptically polarized light, and the elliptically polarized light passes through the counter-substrate CT. Since the elliptically polarized light can pass through the second polarization control element POL2, it contributes to single-color light display corresponding to the color of the color filter 34.

On the other hand, light, which passes through the liquid crystal layer LQ in the transmission section PT, behaves in the following manner in a voltage-on state. Like the voltage-off state, incident backlight from the array substrate AR side passes through the first polarization control element POL1 and is converted to polarized light that is, for example, elliptically polarized counterclockwise. The elliptically polarized light enters the liquid crystal layer LQ via the array substrate AR. When the residual retardation in the liquid crystal layer LQ at the voltage-on time is 0, the elliptically polarized light undergoes no effect of a phase difference while passing through the liquid crystal layer LQ. Thus, the elliptically polarized light passes through the counter-substrate CT in the unchanged polarized state. This elliptically polarized light does not pass through the second polarization control element POL2. Thus, dark display, that is, black display, is effected.

As has been described above, in the transmission section PT, backlight is selectively transmitted to display an image.

FIG. 10 shows optical characteristics of the semi-transmission type liquid crystal display devices according to Comparative Example 1 and Embodiment 1, which operate as described above. The device of Comparative Example 1 is configured such that an ellipticity of 0.88 is obtained with respect to light with a wavelength of 550 nm, and a substantially equal ellipticity is obtained in a wavelength range of 450 nm to 650 nm. The device according to Embodiment 1 is configured such that an ellipticity of 0.75 is obtained with respect to light with a wavelength of 550 nm, and a substantially equal ellipticity is obtained in a wavelength range of 450 nm to 650 nm.

In Comparative Example 1, the reflection section had a reflectance of 7%. In Embodiment 1, too, the reflection section had a reflectance of 6.98%, which is substantially equal to the reflectance in Comparative Example 1 and is improved, compared to Comparative Example 2. In Comparative Example 1, the reflection section had a contrast of 25. In Embodiment 1, the reflection section had a contrast of 15, which is in a tolerable range and is improved, compared to Comparative Example 2. In Comparative Example 1, the hue of white of an image displayed on the reflection section was (x, y)=(0.319, 0.339) on the chromaticity coordinates. In Embodiment 1, the hue of white was (x, y)=(0.321, 0.341) on the chromaticity coordinates, and was substantially equal to that in Comparative Example 1 and was improved, compared to Comparative Example 2.

In Comparative Example 1, the transmission section had a transmittance of 4.4%. In Embodiment 1, too, the transmission section had a substantially equal transmittance of 4.4%. In Comparative Example 1, the transmission section had a contrast of 136. In Embodiment 1, the transmission section had a contrast of 113. In Comparative Example 1, the hue of white of an image displayed on the transmission section was (x, y)=(0.303, 0.327) on the chromaticity coordinates. In Embodiment 1, the hue of white was (x, y)= (0.310, 0.330) on the chromaticity coordinates, and was substantially equal to that in Comparative Example 1.

As has been described above, even in the case where the polarization control element is composed of a polarizer plate and one phase plate (¼ wavelength plate), if this polarization control element is applied to the semi-transmission type liquid crystal display device in the state in which the angle formed between the absorption axis of the polarizer plate and the slow axis of the phase plate is optimized, this device can realize the same function as the semi-transmission type liquid crystal display device that is formed by combining a polarizer plate and two kinds of phase plates (½ wavelength plate and ¼ wavelength plate). Good optical characteristics can be realized both in reflective display in the reflection section and in transmissive display in the transmission section.

Since the structure of the polarization control element can be simplified and the thickness thereof can be reduced, it becomes possible to provide a semi-transmission type liquid crystal display device that can achieve reduction in cost and thickness at a time.

ANOTHER EMBODIMENT; EMBODIMENT 2

In the above-described Embodiment 1, the liquid crystal layer LQ is formed of a liquid crystal composition that includes liquid crystal molecules 40, whose twist angle is set at 0° ("homogeneous orientation"). This invention, however, is not restricted by the twist angle of liquid crystal molecules 40.

For example, the liquid crystal layer LQ may be formed of a liquid crystal composition that includes liquid crystal molecules, whose twist angle is set at 45°. In this case, too, the director 40D of liquid crystal molecules 40 is set to be the Y axis in the plane shown in FIG. 3.

The second polarizer plate 61 is disposed at the angle A that is defined between the absorption axis 61T of the second polarizer plate 61 and the X axis. The second phase plate 62 is disposed at the angle B that is defined between the slow axis 62D of the second phase plate 62 and the X axis. The first polarizer plate 51 is disposed at the angle C that is defined between the absorption axis 51T of the first polarizer plate 51 and the X axis. The first phase plate 52 is disposed at the angle D that is defined between the slow axis 52D of the first phase plate 52 and the X axis.

Figures 11, 12:
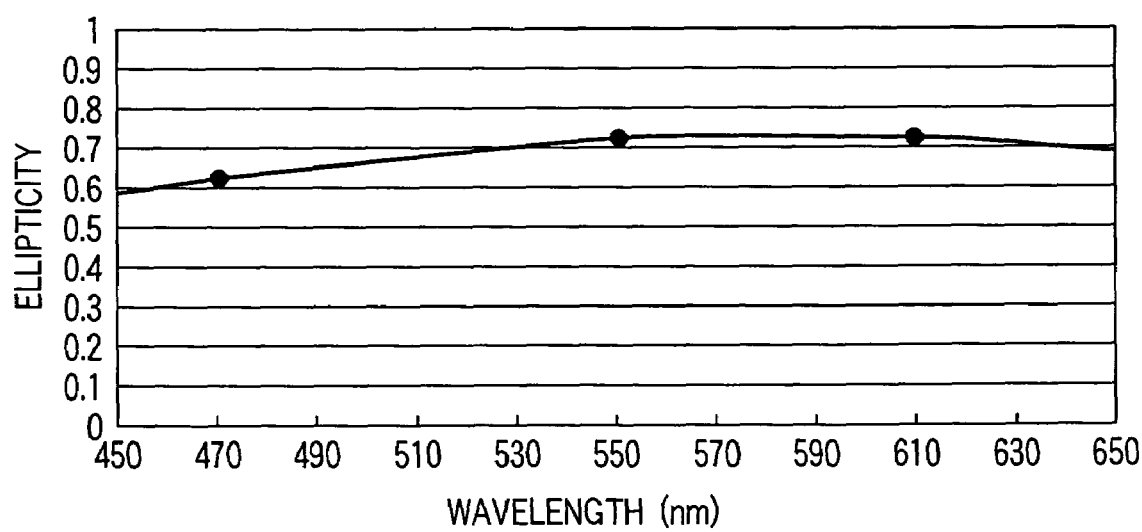
FIG. 11 shows angles of absorption axes and slow axes to the X axis in a first polarization control element and a second polarization control element that are applied to Embodiment 2, and retardation values of a first phase plate and a second phase plate.
FIG. 12 shows a distribution of ellipticity of elliptically polarized light, which is obtained by the polarization control element applied to Embodiment 2, in relation to wavelengths.

In Embodiment 2, as shown in FIG. 11, the formed angle A is 10° and the formed angle B is 50°. Accordingly, the acute angle θ2 formed between the absorption axis 61T of the second polarizer plate 61 and the slow axis 62D of the second phase plate 62 is 40°. In addition, the formed angle C is 100°, and the formed angle B is 154°. Thus, the acute angle θ1 formed between the absorption axis 51T of the first polarizer plate 51 and the slow axis 52D of the first phase plate 52 is 54°. The retardation value (R value) of the first phase plate 52 is 140 nm with respect to light with a wavelength of 550 nm. The retardation value (R value) of the second phase plate 62 is 120 nm with respect to light with a wavelength of 550 nm.

The formed angles A to D and the retardation values of the first phase plate 52 and second phase plate 62 vary depending on retardation values in the voltage-off state, or residual retardation values in the voltage-on state. Thus, these values are not limited to those shown in FIG. 11.

As is shown in FIG. 12, with the second polarization control element POL2 that is applied here, a substantially equal ellipticity is obtained in the entire wavelength range of 450 nm to 650 nm, and it is possible to obtain elliptically polarized light in a polarization state with a substantially equal ellipticity regardless of the wavelength of light that passes therethrough (the difference between the maximum value and minimum value of ellipticity in the entire wavelength range is about 0.13). With the first polarization control element POL1, too, characteristics that are substantially equal to those of the second polarization control element POL2 as shown in FIG. 12 can be obtained.

According to Embodiment 2, the first polarization control element POL1 and second polarization control element POL2 can control the polarization state of light that passes therethrough, and can produce elliptically polarized light that enters the liquid crystal layer LQ. In addition, the ellipticity of light with the wavelength of 550 nm, which is incident on the liquid crystal layer LQ in an elliptical polarization state, can be set between 0.5 and 0.85. Furthermore, according to Embodiment 2, the ellipticity of light in the wavelength range of 450 nm to 650 nm, which is incident on the liquid crystal layer LQ, can be made substantially uniform, and the difference between the maximum value and minimum value of ellipticity can be set to less than 0.15.

The optical characteristics of the liquid crystal display device (Embodiment 2), which includes the optimized first polarization control element POL1 and second polarization control element POL2, as shown in FIG. 12, were compared with the optical characteristics of a liquid crystal display device (Comparative Example 3) having a polarization control element that includes two kinds of phase plates (½ wavelength plate and ¼ wavelength plate). Both Comparative Example 3 and Embodiment 2 are configured as semi-transmission type liquid crystal display devices, each of which has a liquid crystal layer including liquid crystal molecules with a twist angle of 45° and has a normally white display mode.

As is shown in FIG. 13, the device of Comparative Example 3 is configured such that an ellipticity of 0.88 is obtained with respect to light with a wavelength of 550 nm, and a substantially equal ellipticity is obtained in a wavelength range of 450 nm to 650 nm. The device according to Embodiment 2 is configured such that an ellipticity of 0.73 is obtained with respect to light with a wavelength of 550 nm, and a substantially equal ellipticity is obtained in a wavelength range of 450 nm to 650 nm. In this case, in Comparative Example 3, the reflection section had a reflectance of 7.20%. In Embodiment 2, the reflection section had a reflectance of 7.21%, which is substantially equal to the reflectance in Comparative Example 3. In Comparative Example 3, the reflection section had a contrast of 15. In Embodiment 2, the reflection section had a contrast of 10, which is in a tolerable range. In Comparative Example 3, the hue of white of an image displayed on the reflection section was (x, y)=(0.315, 0.348) on the chromaticity coordinates. In Embodiment 2, the hue of white was (x, y)=(0.317, 0.344) on the chromaticity coordinates, and was substantially equal to that in Comparative Example 3.

In Comparative Example 3, the transmission section had a transmittance of 4.40%. In Embodiment 2, too, the transmission section had a substantially equal transmittance of 4.40%. In Comparative Example 3, the transmission section had a contrast of 70. In Embodiment 2, the transmission section had a contrast of 80 that is higher than in Comparative Example 3. Further, in Comparative Example 3, the hue of white of an image displayed on the transmission section was (x, y)=(0.317, 0.337) on the chromaticity coordinates. In Embodiment 2, the hue of white was (x, y)=(0.321, 0.345) on the chromaticity coordinates, and was substantially equal to that in Comparative Example 3.

As has been described above, in Embodiment 2, the same advantageous effects as with Embodiment 1 were obtained.

ANOTHER EMBODIMENT; EMBODIMENT 3

In Embodiment 3, MJ012166 (manufactured by Merck & Co., Δn=0.06) is used as the liquid crystal composition, and the twist angle of liquid crystal molecules 40 is set at 0 deg (homogeneous orientation). In addition, in Embodiment 3, the gap in the reflection section PR is set at about 2.8 μm, and the gap in the transmission section PT is set at about 5.1 μm.

In Embodiment 3, too, the director 40D of the liquid crystal molecule 40 is set at the Y axis in the plane shown in FIG. 3. As is shown in FIG. 14, the angle A formed between the absorption axis 61T of the second polarizer plate 61 and the X axis is 1°. The angle B formed between the slow axis 62D of the second phase plate 62 and the X axis is 36°. Accordingly, an acute angle θ2 formed between the absorption axis 61T of the second polarizer plate 61 and the slow axis 62D of the second phase plate 62 is 35°. In addition, the angle C formed between the absorption axis 51T of the first polarizer plate 51 and the X axis is 93.5°. The angle D formed between the slow axis 52D of the first phase plate 52 and the X axis is 146.5°. Accordingly, an acute angle θ1 formed between the absorption axis 51T of the first polarizer plate 51 and the slow axis 52D of the first phase plate 52 is 53°. Besides, the retardation value (R value) of the first phase plate 52 is 145 nm with respect to light with a wavelength of 550 nm. The retardation value (R value) of the second phase plate 62 is 145 nm with respect to light with a wavelength of 550 nm.

The formed angles A to D and the retardation values of the first phase plate 52 and second phase plate 62 vary depending on retardation values in the voltage-off state, or residual retardation values in the voltage-on state. Thus, these values are not limited to those shown in FIG. 14.

According to Embodiment 3, the first polarization control element POL1 and second polarization control element POL2, which are optimized as described above, can control the polarization state of light that passes therethrough, and can produce elliptically polarized light that enters the liquid crystal layer LQ. In addition, the ellipticity of light with the wavelength of 550 nm, which is incident on the liquid crystal layer LQ in an elliptical polarization state, can be set between 0.5 and 0.85. Furthermore, according to Embodiment 3, the ellipticity of light in the wavelength range of 450 nm to 650 nm, which is incident on the liquid crystal layer LQ, can be made substantially uniform, and the difference between the maximum value and minimum value of ellipticity can be set at less than 0.15.

The optical characteristics of the liquid crystal display device (Embodiment 3), which includes the optimized first polarization control element POL1 and second polarization control element POL2, were compared with the optical characteristics of a liquid crystal display device (Comparative Example 4) having a polarization control element that includes two kinds of phase plates (½ wavelength plate and ¼ wavelength plate). Both Comparative Example 4 and Embodiment 3 are configured as semi-transmission type liquid crystal display devices, each of which has a liquid crystal layer including homogeneously oriented liquid crystal molecules and has a normally white display mode.

As is shown in FIG. 15, the device of Comparative Example 4 is configured such that an ellipticity of 0.67 is obtained with respect to light with a wavelength of 550 nm, and the difference between the maximum value and minimum value of ellipticity of light in the wavelength range of 450 nm to 650 nm is set at 0.07. The device according to Embodiment 3 is configured such that an ellipticity of 0.67 is obtained with respect to light with a wavelength of 550 nm, and the difference between the maximum value and minimum value of ellipticity of light in the wavelength range of 450 nm to 650 nm is set at 0.1.

In Comparative Example 4, the reflection section had a reflectance of 8.30%. In Embodiment 3, the reflection section had a reflectance of 8.30%, which is substantially equal to the reflectance in Comparative Example 4. In Comparative Example 4, the reflection section had a contrast of 13. In Embodiment 3, the reflection section had a contrast of 12, which is in a tolerable range. In Comparative Example 4, the hue of white of an image displayed on the reflection section was (x, y)=(0.317, 0.343) on the chromaticity coordinates. In Embodiment 3, the hue of white was (x, y)=(0.321, 0.344) on the chromaticity coordinates, and was substantially equal to that in Comparative Example 4.

In Comparative Example 4, the transmission section had a transmittance of 4.20%. In Embodiment 3, too, the transmission section had a substantially equal transmittance of 4.20%. In Comparative Example 4, the transmission section had a contrast of 60. In Embodiment 3, the transmission section had a contrast of 70 that is higher than in Comparative Example 4. Further, in Comparative Example 4, the hue of white of an image displayed on the transmission section was (x, y)=(0.289, 0.327) on the chromaticity coordinates. In Embodiment 3, the hue of white was (x, y)=(0.295, 0.330)

on the chromaticity coordinates, and was substantially equal to that in Comparative Example 4.

As has been described above, in Embodiment 3, the same advantageous effects as with Embodiment 1 were obtained.

Figure 16:
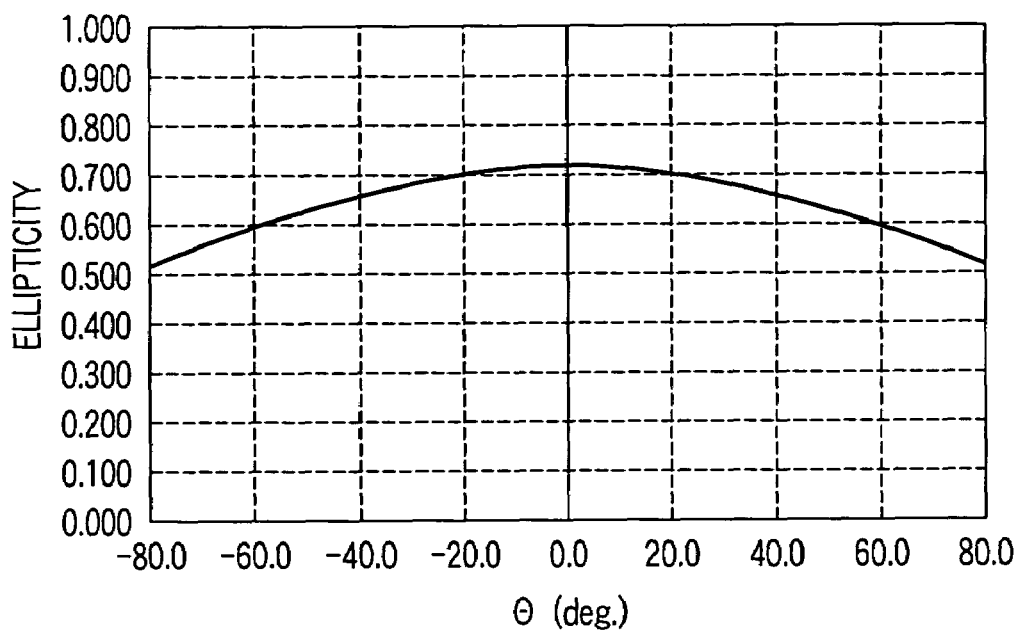
FIG. 16 shows an example of a distribution of ellipticity in relation to an angle Θ formed relative to a normal of the liquid crystal display device according to Embodiment 3.

As regards Embodiment 3, the optical characteristics in the transmission section, in particular, the viewing-angle dependency of contrast in the transmission section, were evaluated. FIG. 16 shows simulation results of ellipticity distributions in a principal viewing-angle direction and a non-principal viewing-angle direction in the liquid crystal display device according to Embodiment 3.

Now assume, as is shown in FIG. 3, that in an Y-Z plane including the normal Z and the Y axis of the liquid crystal display panel, an angle Θ (deg) formed between the normal Z and a given line, which is inclined toward the positive (+) direction on the Y axis from the normal Z, is a positive (+) angle, and an angle Θ formed between the normal Z and a given line, which is inclined toward the negative (−) direction on the Y axis from the normal Z, is a negative (−) angle. In this case, an angle Θ formed between the director 40D of the liquid crystal molecule 40 and the normal Z is present in the negative range. Further, assume that the angle range in which the director 40D of liquid crystal molecule 40 is present, that is, the range of angle Θ between 0° and −90°, is referred to as a principal viewing-angle direction (i.e. the lower side of the screen), and the angle range in which the director 40D of liquid crystal molecule 40 is not present, that is, the range of angle Θ between 0° and 90°, is referred to as a non-principal viewing-angle direction (i.e. the upper side of the screen).

As is shown in FIG. 16, in Embodiment 3, the ellipticity of elliptically polarized light was successfully increased, in particular, on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. The retardation value of the liquid crystal layer in the principal viewing-angle direction can effectively be optically compensated.

Figure 17:
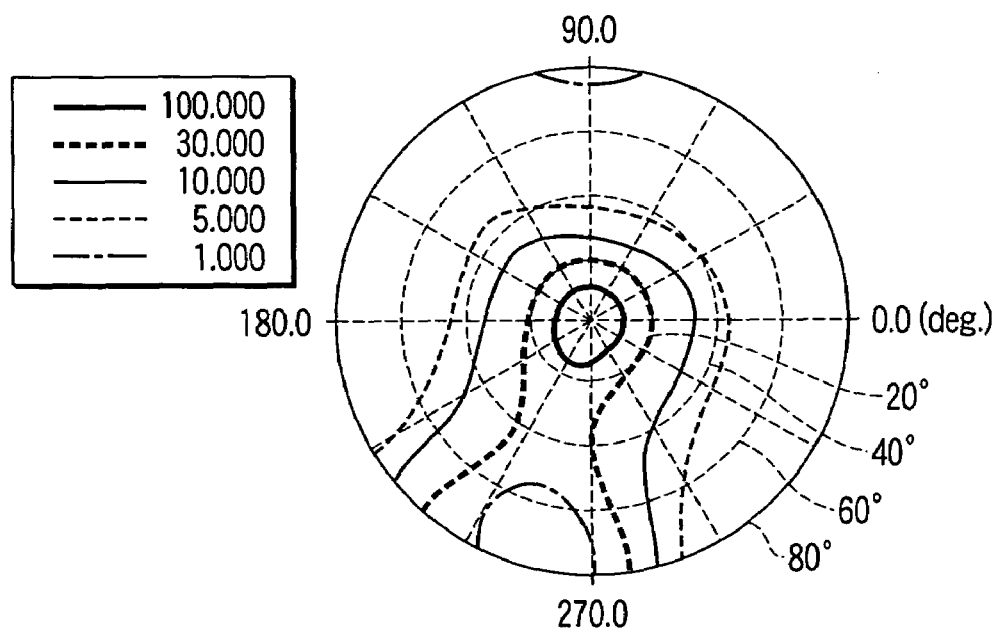
FIG. 17 is a characteristic diagram showing the viewing-angle dependency of contrast in the liquid crystal display device according to Embodiment 3.

FIG. 17 is a characteristic diagram that simulates the viewing-angle dependency of contrast in the transmission section of the liquid crystal display device according to Embodiment 3. In the characteristic diagram, the center corresponds to the normal direction of the liquid crystal display panel. A 0 (deg) azimuth corresponds to the positive (+) direction on the X axis. A 180 (deg) azimuth corresponds to a negative (−) direction on the X axis. A 90 (deg) azimuth corresponds to a positive (+) direction on the Y axis (i.e. the upper side of the screen: non-principal viewing-angle direction). A 270 (deg) azimuth corresponds to a negative (−) direction on the Y axis (i.e. the lower side of the screen: principal viewing-angle direction). Concentric circles defined about the normal direction indicate off-axis angles relative to the normal, and correspond to 20°, 40°, 60° and 80°, respectively. These characteristic diagrams were prepared by plotting angles at which the contrast is equal in the respective directions.

As is clear from FIG. 17, in Embodiment 3, the viewing-angle dependency was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated.

According to Embodiment 3, in transmission display, the viewing angle can be increased in the principal viewing-angle direction, and the viewing-angle dependency of contrast can be improved.

ANOTHER EMBODIMENT; EMBODIMENT 4

In Embodiment 4, MJ981549 (manufactured by Merck & Co., Δn=0.065) is used as the liquid crystal composition, and the twist angle of liquid crystal molecules 40 is set at 0 deg (homogeneous orientation). In addition, in Embodiment 4, the gap in the reflection section PR is set at about 2.6 μm, and the gap in the transmission section PT is set at about 4.8 μm.

In Embodiment 4, too, the director 40D of the liquid crystal molecule 40 is set at the Y axis in the plane shown in FIG. 3. As is shown in FIG. 18, the angle A formed between the absorption axis 61T of the second polarizer plate 61 and the X axis is 1°. The angle B formed between the slow axis 62D of the second phase plate 62 and the X axis is 36°. Accordingly, an acute angle θ2 formed between the absorption axis 61T of the second polarizer plate 61 and the slow axis 62D of the second phase plate 62 is 35°. In addition, the angle C formed between the absorption axis 51T of the first polarizer plate 51 and the X axis is 91.5°. The angle D formed between the slow axis 52D of the first phase plate 52 and the X axis is 145°. Accordingly, an acute angle θ1 formed between the absorption axis 51T of the first polarizer plate 51 and the slow axis 52D of the first phase plate 52 is 53.5°. Besides, the retardation value (R value) of the first phase plate 52 is 145 nm with respect to light with a wavelength of 550 nm. The retardation value (R value) of the second phase plate 62 is 145 nm with respect to light with a wavelength of 550 nm.

The formed angles A to D and the retardation values of the first phase plate 52 and second phase plate 62 vary depending on retardation values in the voltage-off state, or residual retardation values in the voltage-on state. Thus, these values are not limited to those shown in FIG. 18.

According to Embodiment 4, the first polarization control element POL1 and second polarization control element POL2, which are optimized as described above, can control the polarization state of light that passes therethrough, and can produce elliptically polarized light that enters the liquid crystal layer LQ. In addition, the ellipticity of light with the wavelength of 550 nm, which is incident on the liquid crystal layer LQ in an elliptical polarization state, can be set between 0.5 and 0.85. Furthermore, according to Embodiment 4, the ellipticity of light in the wavelength range of 450 nm to 650 nm, which is incident on the liquid crystal layer LQ, can be made substantially uniform, and the difference between the maximum value and minimum value of ellipticity can be set at less than 0.15.

The optical characteristics of the liquid crystal display device (Embodiment 4), which includes the optimized first polarization control element POL1 and second polarization control element POL2, were compared with the optical characteristics of a liquid crystal display device (Comparative Example 5) having a polarization control element that includes two kinds of phase plates (½ wavelength plate and ¼ wavelength plate). Both Comparative Example 5 and Embodiment 4 are configured as semi-transmission type liquid crystal display devices, each of which has a liquid crystal layer including homogeneously oriented liquid crystal molecules and has a normally white display mode.

As is shown in FIG. 19, the device of Comparative Example 5 is configured such that an ellipticity of 0.67 is obtained with respect to light with a wavelength of 550 nm, and the difference between the maximum value and minimum value of ellipticity of light in the wavelength range of 450 nm to 650 nm is set at 0.07. The device according to Embodiment 4 is configured such that an ellipticity of 0.67 is obtained with respect to light with a wavelength of 550 nm, and the difference between the maximum value and minimum value of ellipticity of light in the wavelength range of 450 nm to 650 nm is set at 0.1.

In Comparative Example 5, the reflection section had a reflectance of 7.50%. In Embodiment 4, the reflection section had a reflectance of 7.60%, which is substantially equal to the reflectance in Comparative Example 5. In Comparative Example 5 and Embodiment 4, the reflection section had a contrast of 23. In Comparative Example 5, the hue of white of an image displayed on the reflection section was (x, y)=(0.327, 0.361) on the chromaticity coordinates. In Embodiment 4, the hue of white was (x, y)=(0.322, 0.355) on the chromaticity coordinates, and was substantially equal to that in Comparative Example 5.

In Comparative Example 5 and Embodiment 4, the transmission section had a transmittance of 4.20%. In Comparative Example 5, the transmission section had a contrast of 125. In Embodiment 4, the transmission section had a contrast of 188 that is higher than in Comparative Example 5. Further, in Comparative Example 5, the hue of white of an image displayed on the transmission section was (x, y)=(0.303, 0.328) on the chromaticity coordinates. In Embodiment 4, the hue of white was (x, y)=(0.304, 0.327) on the chromaticity coordinates, and was substantially equal to that in Comparative Example 5.

As has been described above, in Embodiment 4, the same advantageous effects as with Embodiment 1 were obtained.

As regards Embodiment 4, the optical characteristics in the transmission section, in particular, the viewing-angle dependency of contrast in the transmission section, were evaluated. FIG. 20 shows simulation results of ellipticity distributions in the principal viewing-angle direction and the non-principal viewing-angle direction in the liquid crystal display device according to Embodiment 4.

As is shown in FIG. 20, in Embodiment 4, the ellipticity of elliptically polarized light was successfully increased, in particular, on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. The retardation value of the liquid crystal layer in the principal viewing-angle direction can effectively be optically compensated.

FIG. 21 is a characteristic diagram that simulates the viewing-angle dependency of contrast in the transmission section of the liquid crystal display device according to Embodiment 4. As is clear from FIG. 21, in Embodiment 4, the viewing-angle dependency was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated.

According to Embodiment 4, in transmission display, the viewing angle can be increased in the principal viewing-angle direction, and the viewing-angle dependency of contrast can be improved.

ANOTHER EMBODIMENT; EMBODIMENT 5

In Embodiment 5, MJ032591 (manufactured by Merck & Co., $\Delta n=0.07$) is used as the liquid crystal composition, and the twist angle of liquid crystal molecules 40 is set at 0 deg (homogeneous orientation). In addition, in Embodiment 5, the gap in the reflection section PR is set at about 2.4 μm, and the gap in the transmission section PT is set at about 4.6 μm.

In Embodiment 5, too, the director 40D of the liquid crystal molecule 40 is set at the Y axis in the plane shown in FIG. 3. As is shown in FIG. 22, the angle A formed between the absorption axis 61T of the second polarizer plate 61 and the X axis is 1°. The angle B formed between the slow axis 62D of the second phase plate 62 and the X axis is 36°. Accordingly, an acute angle θ2 formed between the absorption axis 61T of the second polarizer plate 61 and the slow axis 62D of the second phase plate 62 is 35°. In addition, the angle C formed between the absorption axis 51T of the first polarizer plate 51 and the X axis is 89°. The angle D formed between the slow axis 52D of the first phase plate 52 and the X axis is 144°. Accordingly, an acute angle θ1 formed between the absorption axis 51T of the first polarizer plate 51 and the slow axis 52D of the first phase plate 52 is 55°. Besides, the retardation value (R value) of the first phase plate 52 is 145 nm with respect to light with a wavelength of 550 nm. The retardation value (R value) of the second phase plate 62 is 145 nm with respect to light with a wavelength of 550 nm.

The formed angles A to D and the retardation values of the first phase plate 52 and second phase plate 62 vary depending on retardation values in the voltage-off state, or residual retardation values in the voltage-on state. Thus, these values are not limited to those shown in FIG. 22.

According to Embodiment 5, the first polarization control element POL1 and second polarization control element POL2, which are optimized as described above, can control the polarization state of light that passes therethrough, and can produce elliptically polarized light that enters the liquid crystal layer LQ. In addition, the ellipticity of light with the wavelength of 550 nm, which is incident on the liquid crystal layer LQ in an elliptical polarization state, can be set between 0.5 and 0.85. Furthermore, according to Embodiment 5, the ellipticity of light in the wavelength range of 450 nm to 650 nm, which is incident on the liquid crystal layer LQ, can be made substantially uniform, and the difference between the maximum value and minimum value of ellipticity can be set at less than 0.15.

The optical characteristics of the liquid crystal display device (Embodiment 5), which includes the optimized first polarization control element POL1 and second polarization control element POL2, were compared with the optical characteristics of a liquid crystal display device (Comparative Example 6) having a polarization control element that includes two kinds of phase plates (½ wavelength plate and ¼ wavelength plate). Both Comparative Example 6 and Embodiment 5 are configured as semi-transmission type liquid crystal display devices, each of which has a liquid crystal layer including homogeneously oriented liquid crystal molecules and has a normally white display mode.

As is shown in FIG. 23, the device of Comparative Example 6 is configured such that an ellipticity of 0.67 is obtained with respect to light with a wavelength of 550 nm, and the difference between the maximum value and minimum value of ellipticity of light in the wavelength range of 450 nm to 650 nm is set at 0.07. The device according to Embodiment 5 is configured such that an ellipticity of 0.67 is obtained with respect to light with a wavelength of 550 nm, and the difference between the maximum value and minimum value of ellipticity of light in the wavelength range of 450 nm to 650 nm is set at 0.1.

In Comparative Example 6 and Embodiment 5, the reflection section had a reflectance of 9.70%. In Comparative Example 6, the reflection section had a contrast of 15. In Embodiment 5, the reflection section had a contrast of 14. In Comparative Example 6, the hue of white of an image displayed on the reflection section was (x, y)=(0.299, 0.317) on the chromaticity coordinates. In Embodiment 5, the hue of white was (x, y)=(0.301, 0.319) on the chromaticity coordinates, and was substantially equal to that in Comparative Example 6.

In Comparative Example 6 and Embodiment 5, the transmission section had a transmittance of 5.20%. In Comparative Example 6 and Embodiment 5, the transmission section had a contrast of 120. Further, in Comparative Example 6, the hue of white of an image displayed on the transmission section was (x, y)=(0.319, 0.338) on the chromaticity coordinates. In Embodiment 5, the hue of white was (x, y)=(0.320, 0.338) on the chromaticity coordinates, and was substantially equal to that in Comparative Example 6.

As has been described above, in Embodiment 5, the same advantageous effects as with Embodiment 1 were obtained.

Figure 24:
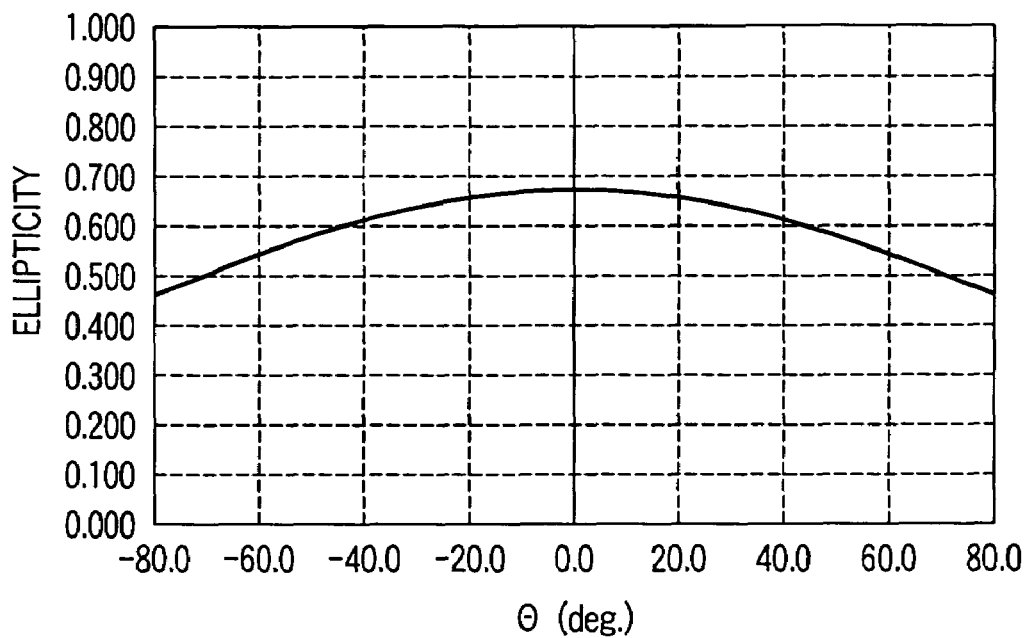
FIG. 24 shows an example of a distribution of ellipticity in relation to an angle Θ formed relative to a normal of the liquid crystal display device according to Embodiment 5.

As regards Embodiment 5, the optical characteristics in the transmission section, in particular, the viewing-angle dependency of contrast in the transmission section, were evaluated. FIG. 24 shows simulation results of ellipticity distributions in the principal viewing-angle direction and the non-principal viewing-angle direction in the liquid crystal display device according to Embodiment 5.

As is shown in FIG. 24, in Embodiment 5, the ellipticity of elliptically polarized light was successfully increased, in particular, on the lower side of the screen, i.e. in the principal viewing-angle direction. That is, elliptically polarized light with an ellipticity of 0.45 or more was obtained in the entire region in the principal viewing-angle direction. Moreover, the variation in the ellipticity distribution in the principal viewing-angle direction was made gentler. Thereby, elliptically polarized light, which is incident on the liquid crystal display panel LPN in the principal viewing-angle direction, was made close to circularly polarized light. The retardation value of the liquid crystal layer in the principal viewing-angle direction can effectively be optically compensated.

Figure 25:
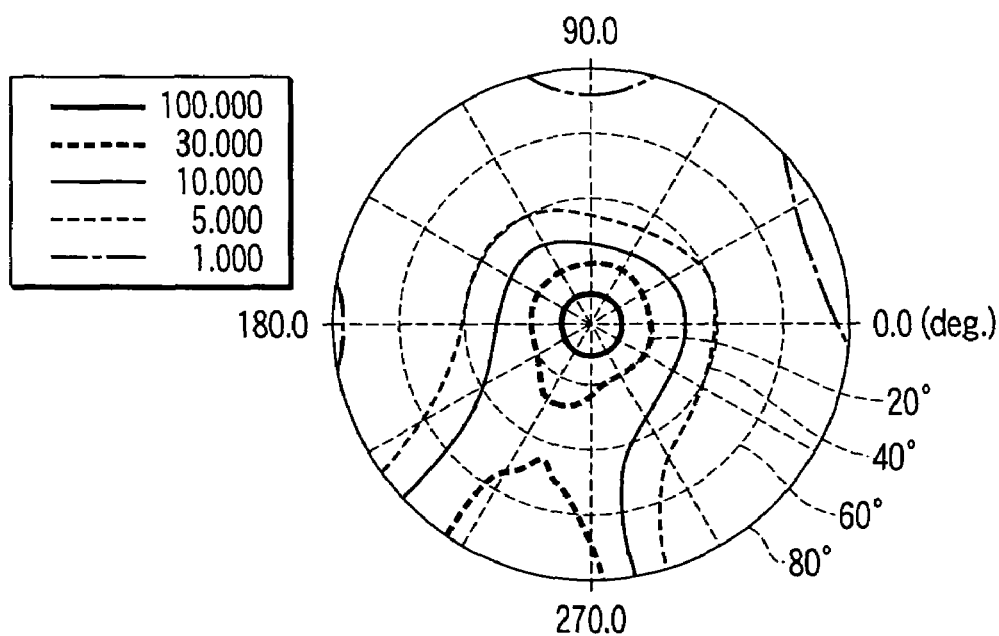
FIG. 25 is a characteristic diagram showing the viewing-angle dependency of contrast in the liquid crystal display device according to Embodiment 5.

FIG. 25 is a characteristic diagram that simulates the viewing-angle dependency of contrast in the transmission section of the liquid crystal display device according to Embodiment 5. As is clear from FIG. 25, in Embodiment 5, the viewing-angle dependency was improved in the upper and lower directions of the screen. In particular, it was confirmed that a decrease in contrast in the principal viewing-angle direction was improved. The reason for this is that the ellipticity of elliptically polarized light that is incident on the liquid crystal display panel was improved and the retardation value of the liquid crystal layer was compensated.

According to Embodiment 5, in transmission display, the viewing angle can be increased in the principal viewing-angle direction, and the viewing-angle dependency of contrast can be improved.

COMPARATIVE EXAMPLE

Figure 26:
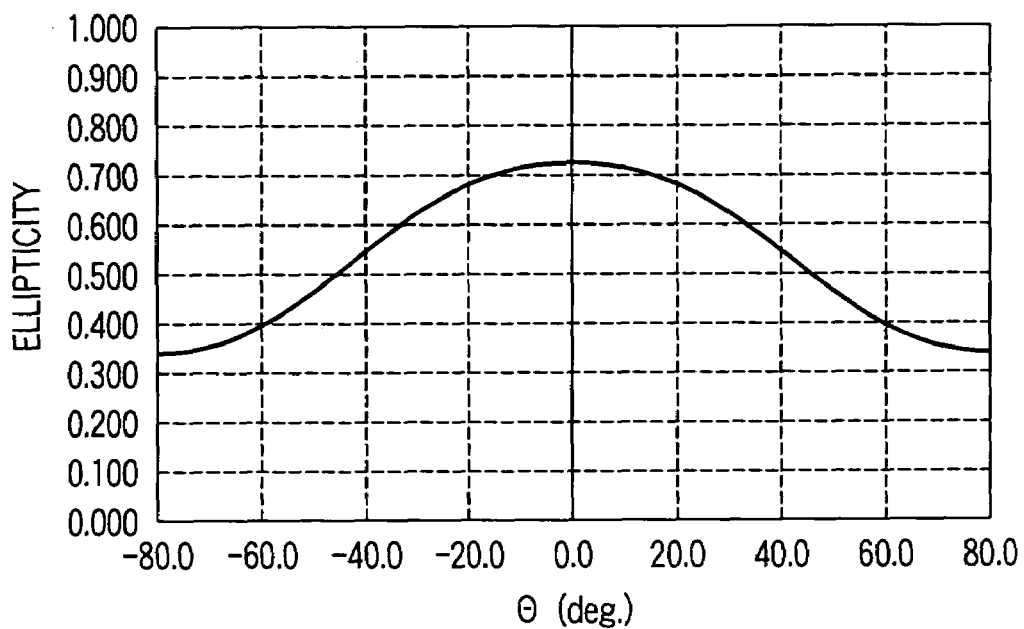
FIG. 26 shows an example of a distribution of ellipticity in relation to an angle Θ formed relative to a normal of a liquid crystal display device according to a comparative example.
Figure 27:
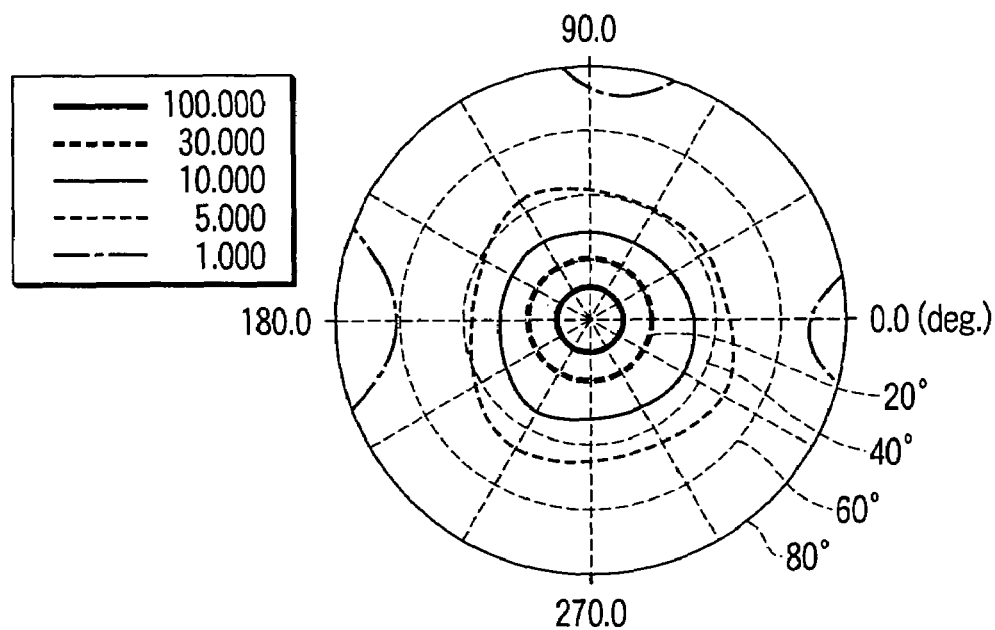
FIG. 27 is a characteristic diagram showing the viewing-angle dependency of contrast in the liquid crystal display device according to the comparative example.

FIG. 26 shows simulation results of ellipticity distributions in the principal viewing-angle direction and the non-principal viewing-angle direction in a liquid crystal display device according to a comparative example. FIG. 26 shows simulation results relating to, for instance, the liquid crystal display device of Comparative Example 4, but similar results are obtainable with respect to Comparative Examples 5 and 6. As is shown in FIG. 26, in the comparative example, as the angle Θ increases (i.e. as the off-axis angle relative to the normal increases), the ellipticity considerably deteriorates, and the variation in ellipticity distribution in the principal viewing-angle direction is steep. Consequently, the retardation value of the liquid crystal layer in the principal viewing-angle direction could not sufficiently be optically compensated FIG. 27 is a characteristic diagram that simulates the viewing-angle dependency of contrast in the transmission section of the liquid crystal display device according to the comparative example. As shown in FIG. 27, the viewing-angle dependency was not sufficiently improved in the upper and lower directions of the screen. In particular, a decrease in contrast in the principal viewing-angle direction was conspicuous.

The present invention is not limited to the above-described embodiments. In practicing the invention, structural elements may be modified and embodied without departing from the spirit of the invention. A plurality of structural elements disclosed in the embodiments may be properly combined to constitute various inventions. For example, some of the structural elements in the embodiments may be omitted. Furthermore, structural elements in different embodiments may be properly combined.

In the example shown in FIG. 2, each of the first polarization control element POL1 and second polarization control element POL2 is formed of one polarizer plate 51, 61, and one phase plate 52, 62. However, the combination of components in the polarization control element is not limited to this, if the polarization control element is configured to produce elliptically polarized light that is incident on the liquid crystal layer LQ, as mentioned above. For example, each of the first polarization control element POL1 and second polarization control element POL2 may be formed of a combination of a plurality of polarizer plates, a plurality of phase plates, or a plurality of kinds of phase plates. At least one of the phase plates 52 and 62 may be a biaxial phase plate or a hybrid-oriented liquid crystal film.

Each of the first polarization control element POL1 and second polarization control element POL2 may be formed by attaching a high-polymer-film phase plate to a polarizer plate, or by disposing a liquid crystal film on a polarizer plate. The polarization control element including a liquid crystal film can be formed by coating a liquid crystal composition, for instance, a liquid crystal composition including nematic liquid crystal, on a polarizer plate and then curing the liquid crystal composition. In this case, the thickness of the liquid crystal film is set so as to obtain a desired retardation value. When the polarization control element including such a liquid crystal film is to be applied, there arises no problem if the director of the liquid crystal molecules in the liquid crystal film is made to agree with the aforementioned slow axis.

In the embodiments, the thin-film transistor W is formed of an N-channel thin-film transistor. Alternatively, other architectures may be adopted if similar drive signals can be produced.

As has been described above, the present invention can provide a liquid crystal display device with good optical characteristics, which can realize reduction in thickness and cost.

What is claimed is:

1. A liquid crystal display device including a reflection section and a transmission section in each of a plurality of pixels arranged in a matrix, the device comprising:

a liquid crystal display panel in which a liquid crystal layer including homogeneously oriented liquid crystal molecules is held between a first substrate and a second substrate that are disposed to face each other;

a first polarization control element provided on an outer surface of the first substrate, which is opposed to a surface of the first substrate that holds the liquid crystal layer; and a second polarization control element provided on an outer surface of the second substrate, which is opposed to a surface of the second substrate that holds the liquid crystal layer, wherein the first polarization control element and the second polarization control element control a polarization state of light that passes therethrough, such that light in a polarization state of elliptically polarized light is to be incident on the liquid crystal layer, an ellipticity of light with a wavelength of 550 nm, which is in the polarization state of elliptically polarized light, is between 0.5 and 0.85, and a difference between a maximum value and a minimum value of the ellipticity of light in the wavelength range of 450 nm to 650 nm in the polarization state of the elliptically polarized light incident on the liquid crystal layer is less than 0.15.

2. The liquid crystal display device according to claim 1, wherein each of the first polarization control element and the second polarization control element comprises at least one polarizer plate and at least one phase plate.

3. The liquid crystal display device according to claim 2, wherein the phase plate provides a phase difference of ¼ wavelength between an ordinary ray and an extraordinary ray with respect to light of a predetermined wavelength.

4. The liquid crystal display device according to claim 2, wherein at least in the second polarization control element, an acute angle formed between an absorption axis of the polarizer plate and a slow axis of the phase plate is set in a range between 25° and 65°.

5. The liquid crystal display device according to claim 1, further comprising a backlight unit that illuminates the liquid crystal display panel from the first polarization control element side.

6. The liquid crystal display device according to claim 1, wherein a display mode is a normally white mode.

* * * * *

UNITED STATES PATENT AND TRADEMARK OFFICE
CERTIFICATE OF CORRECTION

PATENT NO.        : 7,256,844 B2                                                Page 1 of 1
APPLICATION NO.   : 10/986382
DATED             : August 14, 2007
INVENTOR(S)       : Kazuhiro Joten It is certified that error appears in the above-identified patent and that said Letters Patent is hereby corrected as shown below:

On the Title page item (63), change "PCT/JP04/00521" to --PCT/JP04/005217--.

Signed and Sealed this

Ninth Day of September, 2008

JON W. DUDAS
*Director of the United States Patent and Trademark Office*